United States Patent
Hopkins et al.

(10) Patent No.: US 11,069,889 B2
(45) Date of Patent: Jul. 20, 2021

(54) ZINC ELECTRODE IMPROVEMENTS

(71) Applicant: The Government of the United States of America, as represented by the Secretary of the Navy, Arlington, VA (US)

(72) Inventors: Brandon J. Hopkins, Bethesda, MD (US); Joseph F. Parker, Riva, MD (US); Jeffrey W. Long, Alexandria, VA (US); Debra R. Rolison, Arlington, VA (US)

(73) Assignee: The Government of the United States of America, as represented by the Secretare of the Navy, Washington, DC (US)

( * ) Notice: Subject to any disclaimer, the term of this patent is extended or adjusted under 35 U.S.C. 154(b) by 0 days.

(21) Appl. No.: 16/932,695

(22) Filed: Jul. 17, 2020

(65) Prior Publication Data

US 2021/0020916 A1   Jan. 21, 2021

Related U.S. Application Data

(60) Provisional application No. 62/876,114, filed on Jul. 19, 2019.

(51) Int. Cl.
*H01M 4/38* (2006.01)
*H01M 4/36* (2006.01)
(Continued)

(52) U.S. Cl.
CPC ............ *H01M 4/30* (2013.01); *B22F 3/1007* (2013.01); *B22F 3/11* (2013.01); *B22F 3/1143* (2013.01);
(Continued)

(58) Field of Classification Search
None
See application file for complete search history.

(56) References Cited

U.S. PATENT DOCUMENTS

| | | | |
|---|---|---|---|
| 2,640,864 | A | 6/1953 | Fischbach et al. |
| 3,086,068 | A | 4/1963 | Charland et al. |

(Continued)

FOREIGN PATENT DOCUMENTS

| | | |
|---|---|---|
| CN | 104078682 A | 10/2014 |
| EP | 0484605 A1 | 5/1992 |

(Continued)

OTHER PUBLICATIONS

Aurian-Blajeni et al., "Passive Zinc Electrodes: Application of the Effective Medium Theory" J. Electrochem. Soc. 1985, 869-870.

(Continued)

*Primary Examiner* — Ula C Ruddock
*Assistant Examiner* — Amanda Rosenbaum
(74) *Attorney, Agent, or Firm* — US Naval Research Laboratory; Joseph T. Grunkemeyer

(57) ABSTRACT

Disclosed are methods of making porous zinc electrodes. Taken together, the steps are: forming a mixture of water, a soluble compound that increases the viscosity of the mixture, an insoluble porogen, and metallic zinc powder; placing the mixture in a mold to form a sponge; optionally drying the sponge; placing the sponge in a metal mesh positioned to allow air flow through substantially all the openings in the mesh; heating the sponge in an inert atmosphere at a peak temperature of 200 to 420° C. to fuse the zinc particles to each other to form a sintered sponge; and heating the sintered sponge in an oxygen-containing atmosphere at a peak temperature of 420 to 700° C. to form ZnO on the surfaces of the sintered sponge. The heating steps burn out the porogen.

25 Claims, 24 Drawing Sheets

(51) Int. Cl.
| | |
|---|---|
| H01M 4/30 | (2006.01) |
| H01M 4/24 | (2006.01) |
| H01M 4/04 | (2006.01) |
| H01M 4/02 | (2006.01) |
| H01M 10/24 | (2006.01) |
| B22F 3/11 | (2006.01) |
| B22F 3/10 | (2006.01) |

(52) U.S. Cl.
CPC ....... *H01M 4/0433* (2013.01); *H01M 4/0471* (2013.01); *H01M 4/244* (2013.01); *H01M 4/38* (2013.01); *H01M 10/24* (2013.01); *B22F 2301/30* (2013.01); *H01M 2004/021* (2013.01); *H01M 2004/027* (2013.01)

(56) References Cited

U.S. PATENT DOCUMENTS

| | | | |
|---|---|---|---|
| 3,384,482 | A | 5/1968 | Kelly et al. |
| 3,625,765 | A | 12/1971 | Arrance et al. |
| 3,669,754 | A | 6/1972 | Ralston |
| 3,972,729 | A | 8/1976 | Mosetti et al. |
| 4,582,766 | A | 4/1986 | Isenberg et al. |
| 4,842,963 | A | 6/1989 | Ross, Jr. |
| 5,011,529 | A | 4/1991 | Hogue et al. |
| 5,240,793 | A | 8/1993 | Glaeser |
| 5,780,186 | A | 7/1998 | Casey, Jr. |
| 6,558,848 | B1 | 5/2003 | Kobayashi et al. |
| 7,291,186 | B2 | 11/2007 | Zhang |
| 8,039,150 | B2 | 10/2011 | Burchardt et al. |
| 8,623,301 | B1* | 1/2014 | Deininger ............... C25B 13/04 423/21.1 |
| 9,252,616 | B2 | 2/2016 | Goldstein |
| 9,802,254 | B2 | 10/2017 | Rolison et al. |
| 9,947,919 | B2* | 4/2018 | Phillips .................. H01M 10/24 |
| 10,008,711 | B2* | 6/2018 | Rolison ............... H01M 12/085 |
| 10,720,635 | B2 | 7/2020 | Rolison et al. |
| 2001/0003641 | A1 | 6/2001 | Kunitomo et al. |
| 2001/0009741 | A1 | 7/2001 | Durkot et al. |
| 2005/0003271 | A1* | 1/2005 | Jiang .................... H01M 4/0478 429/229 |
| 2006/0273005 | A1 | 12/2006 | Love et al. |
| 2006/0292777 | A1 | 12/2006 | Dunbar |
| 2008/0061693 | A1 | 3/2008 | Lee et al. |
| 2008/0106853 | A1 | 5/2008 | Suenaga |
| 2008/0254364 | A1 | 10/2008 | Sumihiro et al. |
| 2009/0233159 | A1 | 9/2009 | Phillips et al. |
| 2009/0311598 | A1 | 12/2009 | Tadano |
| 2010/0092857 | A1 | 4/2010 | Phillips et al. |
| 2010/0221136 | A1 | 9/2010 | Maffia |
| 2011/0155662 | A1 | 6/2011 | Liu et al. |
| 2011/0207001 | A1 | 8/2011 | Bert et al. |
| 2011/0287307 | A1 | 11/2011 | Fan |
| 2012/0052376 | A1 | 3/2012 | Zhang et al. |
| 2013/0089769 | A1 | 4/2013 | Proctor et al. |
| 2014/0147757 | A1 | 5/2014 | Rolison et al. |
| 2017/0331104 | A1 | 11/2017 | Parker et al. |
| 2017/0338479 | A1 | 11/2017 | Parker et al. |
| 2018/0130998 | A1* | 5/2018 | Parker ..................... H01M 4/06 |
| 2019/0173141 | A1 | 6/2019 | Parker et al. |

FOREIGN PATENT DOCUMENTS

| | | | | |
|---|---|---|---|---|
| EP | 0726607 | A1 * | 8/1996 | ............... H01M 4/62 |
| EP | 0878857 | A1 | 11/1998 | |
| WO | 00/55931 | A1 | 9/2000 | |
| WO | 2006/111835 | A1 | 10/2006 | |
| WO | 2015004069 | A1 | 1/2015 | |
| WO | 2016138594 | A1 | 9/2016 | |

OTHER PUBLICATIONS

Cai et al., "Spectroelectrochemical Studies on Dissolution and Passivation of Zinc Electrodes in Alkaline Solutions" J. Electrochem. Soc., vol. 143, No. 7, Jul. 1996.

Drillet et al., "Development of a Novel Zinc/Air Fuel Cell with a Zn Foam Anode, a PVA/KOH Membrane and a MnO2/SiOC-Based Air Cathode" ECS Trans. 2010, vol. 28, Issue 32, pp. 13-24.

Lee et al., "Novel alloys to improve the electrochemical behavior of zinc anodes for zinc/air battery" Journal of Power Sources 160 (2006) 1436-1441.

Lee et al., "Novel electrochemical behavior of zinc anodes in zinc/air batteries in the presence of additives"Journal of Power Sources 159 (2006) 1474-1477.

Park et al., "Electrochemical Impedance Spectroscopy and Voltammetry of Zinc in Dilute Alkaline Solutions"Analytical Sciences vol. 13 Supplement 1997, 311-316.

Toussaint et al., "Development of a rechargeable zinc-air battery" ECS Transactions, 28 (32) 25-34 (2010).

Zhang, "Novel Anode for High Power Zinc-Air Batteries" ECS Transactions, 3 (42) 1-11 (2008).

Chervin et al., "CAD/CAM-designed 3D-printed electroanalytical cell for the evaluation of nanostructured gas-diffusion electrodes" Nanotechnology 27 (2016) 174002.

Chervin et al., "Aerogel Architectures Boost Oxygen-Evolution Performance of NiFe2Ox Spinels to Activity Levels Commensurate with Nickel-Rich Oxides" ChemElectroChem 2016, 3, 1369-1375.

Ko et al., "Electroanalytical Assessment of the Effect of Ni:Fe Stoichiometry and Architectural Expression on the Bifunctional Activity of Nanoscale NiyFe1—yOx" Langmuir 2017, 33, 9390-9397.

Ko et al., "Electrocatalyzed Oxygen Reduction at Manganese Oxide Nanoarchitectures: From Electroanalytical Characterization to Device-Relevant Performance in Composite Electrodes" J. Electrochem. Soc., 165 (11) H777-H783 (2018).

Ko et al., "Combining battery-like and pseudocapacitive charge storage in 3D MnOx@carbon electrode architectures for zinc-ion cells" Sustainable Energy Fuels, 2018, 2, 626-636.

Li et al., "Advanced zinc-air batteries based on high-performance hybrid electrocatalysts" Nature Communications 4 (2013).

Long et al., "Design of Pore and Matter Architectures in Manganese Oxide Charge-Storage Materials" Electrochem. and Solid-State Lett., 3 (10) 453-456 (2000).

Parker et al., "Rechargeable nickel-3D zinc batteries: An energy-dense, safer alternative to lithium-ion" Science 356, 415-418 (2017).

Parker et al., "Minimizing Shape Change at Zn Sponge Anodes in Rechargeable Ni—Zn Cells: Impact of Electrolyte Formulation" J. Electrochem. Soc., 163 (3) A351-A355 (2016).

Parker et al., "Wiring zinc in three dimensions re-writes battery performance-dendrite-free cycling" Energy Environ. Sci., 2014, 7, 1117-1124.

Parker et al., "Retaining the 3D Framework of Zinc Sponge Anodes upon Deep Discharge in Zn-Air Cells" ACS Appl. Mater. Interfaces 2014, 6, 19471-19476.

Hopkins et al., "Fabricating architected zinc electrodes with unprecedented volumetric capacity in rechargeable alkaline cells" Energy Storage Materials 27 (2020) 370-376.

Hopkins et al., "Low-cost green synthesis of zinc sponge for rechargeable, sustainable batteries" Sustainable Energy Fuels, 2020, 4, 3363-3369.

Ko et al. (2018). "Robust 3D Zn sponges enable high-power, energy-dense alkaline batteries" ACS Appl. Energy Mater. 2, 212-216.

Stock et al. (2018) "Homogeneous coating with an anion-exchange ionomer improves the cycling stability of secondary batteries with zinc anodes" ACS Appl. Mater. Interfaces 10, 8640-8648.

Stock et al. (2018) "Towards zinc-oxygen batteries with enhanced cycling stability: The benefit of anion-exchange ionomer for zinc sponge anodes" J. Power Sources 395, 195-204.

Chamoun et al. (2015) "Hyper-dendritic nanoporous zinc foam anodes" NPG Asia Mater. 7, e178.

Yu et al. (2019) "Ag-modified Cu foams as three-dimensional anodes for rechargeable zinc-air batteries" ACS Appl. Nano Mater. 2, 2679-2688.

(56) References Cited

OTHER PUBLICATIONS

Yan et al. (2015) "Superior cycling stability and high rate capability of three-dimensional Zn/Cu foam electrodes for zinc-based alkaline batteries" RCS Adv. 5, 83781-83797.
Stock et al. (2018) "Design strategy for zinc anodes with enhanced utilization and retention: Electrodeposited zinc oxide on carbon mesh protected by ionomeric layers" ACS Appl. Energy Mater. 1, 5579-5588.

* cited by examiner

ZINC ELECTRODE IMPROVEMENTS

This application claims the benefit of U.S. Provisional Application No. 62/876,114, filed on Jul. 19, 2019. The provisional application and all other publications and patent documents referred to throughout this nonprovisional application are incorporated herein by reference.

TECHNICAL FIELD

The present disclosure is generally related to zinc electrodes for batteries.

DESCRIPTION OF RELATED ART

Zinc (Zn) batteries are becoming safe, sustainable, and energy-dense alternatives to lithium-ion batteries (Parker et al. (2018). Translating materials-level performance into device-relevant metrics for zinc-based batteries. *Joule* 2, 2519-2527; Parker et al. (2017). Rechargeable nickel-3D zinc batteries: an energy-dense, safer alternative to lithium-ion. *Science* 356, 415-418). While Zn batteries have historically suffered from poor rechargeability, Zn-sponge electrodes sustain longer cycle lives than conventional electrodes because their networked, nonperiodic architecture decreases local current density at high current loads and thereby prevents short-circuiting dendrites (Parker (2017); Ko et al. (2018). Robust 3D Zn sponges enable high-power, energy-dense alkaline batteries. *ACS Appl. Energy Mater.* 2, 212-216; Parker et al. (2016). Minimizing shape change at Zn sponge anodes in rechargeable Ni—Zn cells: impact of electrolyte formulation. *J. Electrochem. Soc.* 163, A351-A355; Parker et al. (2014). Retaining the 3D framework of zinc sponge anodes upon deep discharge in Zn-air cells. *ACS Appl. Mater. Interfaces* 6, 19471-19476; Parker et al. (2014). Wiring zinc in three dimensions re-writes battery performance-dendrite free cycling. *Energy Environ. Sci.* 7, 1117-1124; U.S. Pat. Nos. 9,802,254; 10,008,711; Stock et al. (2018). Homogeneous coating with an anion-exchange ionomer improves the cycling stability of secondary batteries with zinc anodes. *ACS Appl. Mater. Interfaces* 10, 8640-8648).

Zinc sponges, however, can fracture under their own weight depending on their dimensions and how they are handled (Ko (2018); Stock (2018). *ACS Appl. Mater. Interfaces*). This fragility limits their maximum practical size, especially when electrodes for large-format applications are desired. Existing methods to strengthen porous, three-dimensional (3D) Zn electrodes typically involve adding supportive inactive materials. Such strengthening techniques include applying ionomeric coatings to the electrode surface (Stock (2018). *ACS Appl. Mater. Interfaces*; Stock et al. (2018). Towards zinc-oxygen batteries with enhanced cycling stability: The benefit of anion-exchange ionomer for zinc sponge anodes. *J. Power Sources*. 395, 195-204) and/or depositing Zn on host structures made of nickel (Chamoun et al. (2015). Hyper-dendritic nanoporous zinc foam anodes. *NPG Asia Mater.* 7, e178), copper (Kang et al. (2019). 3D porous copper skeleton supported zinc anode toward high capacity and long cycle life zinc ion batteries. *ACS Sustainable Chem. Eng.* 7, 3364-3371; Yu et al. (2019). Ag-modified Cu foams as three-dimensional anodes for rechargeable zinc-air batteries. *ACS Appl. Nano Mater.* 2, 2679-2688), or carbon fiber (Stumpp et al. (2018). Controlled electrodeposition of zinc oxide on conductive meshes and foams enabling its use as secondary anode. *J. Electrochem. Soc.* 165, D461-D466; Stock et al. (2018). Design strategy for zinc anodes with enhanced utilization and retention: Electrodeposited zinc oxide on carbon mesh protected by ionomeric layers. *ACS Appl. Energy Mater.* 1, 5579-5588). These workarounds can reduce the electrode's gravimetric capacity by as much as 70%; (Stock (2018). *ACS Appl. Energy Mater*) additionally, few report the electrode's resulting mechanical strength or volumetric capacity.

Zinc electrodes historically have had limited cycle life due to operando formation of dendrites that grow long enough to pierce the cell's separator. A solution to this localized, anomalous dendrite-forming problem involves fabricating the Zn anode as a nonperiodic pore-solid architecture in which the 3D-interconnected void volume is co-continuous with the 3D-interconnected solid zinc network, i.e., a "sponge" form factor. The metallic, conductive pathways in 3D improve current distribution throughout the electrode structure and avoid uneven reaction loci where formation of dendrites is likely to occur during charge-discharge cycles (Ko (2018); Parker (2017); Parker (2016); Parker (2014). *Energy Environ. Sci.*). In addition, the void network intertwined around the 3D zinc scaffold allows for confined volume elements with high surface (zinc) to volume (electrolyte); confinement induces saturation of zincate at lower concentrations than occurs in open solution, thus dehydration to zinc oxide (ZnO) occurs earlier in the discharge process, thereby further minimizing shape change.

The preparation of nonperiodic Zn architectured monoliths still face several problems: 1) reliance on expensive and flammable ingredients to make an oil-and-water emulsion; 2) potential to form nonuniform zinc oxide shells during thermal processing of the forms that result from air-consolidation of the molded emulsion; and 3) requiring time-consuming electroreduction post-thermal processing that yields all metal, but mechanically fragile Zn sponges when scaled beyond a few square centimeters.

BRIEF SUMMARY

Disclosed is a method comprising: forming a mixture comprising: water, a soluble compound that increases the viscosity of the mixture, an insoluble porogen, and metallic zinc powder; placing the mixture in a mold; drying the mixture to form a sponge; heating the sponge in an inert atmosphere at a temperature that fuses the zinc particles to each other to form a sintered sponge; and heating the sintered sponge in an oxygen-containing atmosphere at a temperature that forms ZnO on the surfaces of the sintered sponge. The heating steps burn out the porogen.

Also disclosed is a method comprising: providing a sponge comprising zinc particles and a porogen; placing the sponge in a metal mesh positioned to allow air flow through substantially all the openings in the mesh; heating the sponge in an inert atmosphere at a temperature that fuses the zinc particles to each other to form a sintered sponge; and heating the sintered sponge in an oxygen-containing atmosphere at a temperature that forms ZnO on the surfaces of the sintered sponge. The heating steps burn out the porogen.

Also disclosed is a method comprising: providing a sponge comprising zinc particles and a porogen; heating the sponge in an inert atmosphere at a peak temperature of 200 to 420° C. to fuse the zinc particles to each other to form a sintered sponge; and heating the sintered sponge in an oxygen-containing atmosphere at a peak temperature of 420 to 700° C. to form ZnO on the surfaces of the sintered sponge. The heating steps burn out the porogen.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

Figure 1:
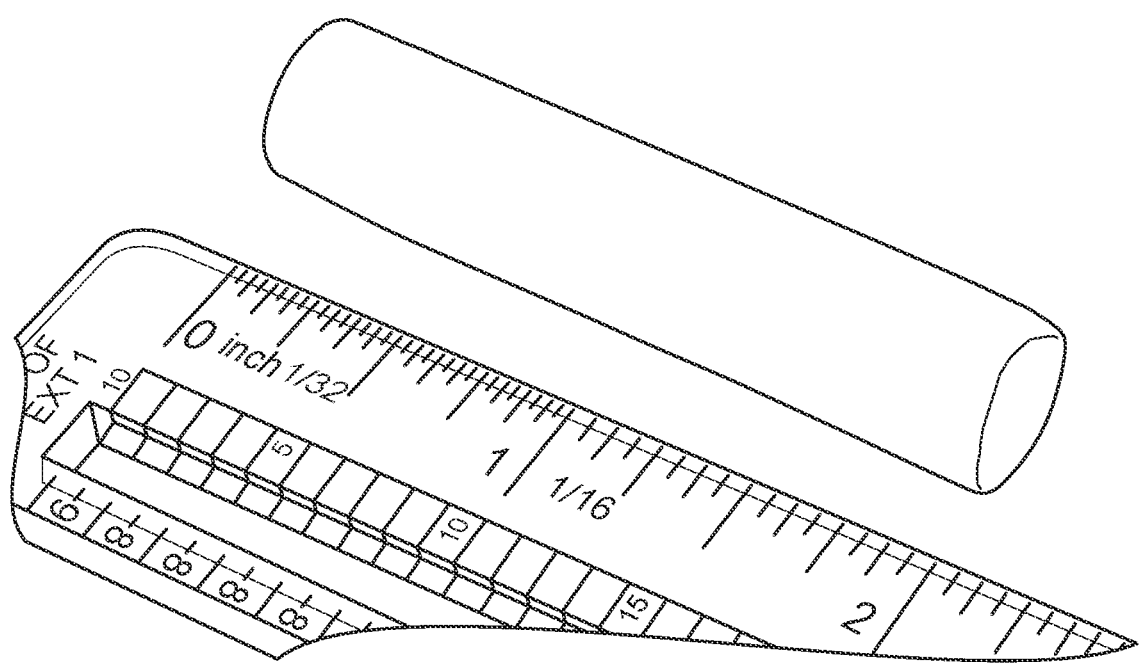
FIG. 1 shows a photograph of a 2 inch-long cylindrical zinc sponge fabricated without using an emulsion protocol.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein are methods to make porous, monolithic zinc (Zn) electrodes that are mechanically rugged and achieve high performance in zinc-based batteries and are fabricated using scalable and low-cost manufacturing methods. The zinc electrodes can be used in rechargeable and primary batteries. Recasting zinc electrodes into sponge form factors enables dendrite-free, rechargeable zinc batteries. Prior versions of these electrodes suffer from insufficient mechanical strength to scale beyond a few square centimeters. Most approaches to fortify zinc electrodes involve adding supportive inactive materials that decrease capacity. In contrast, electrode strength can be boosted through zinc/zinc-oxide fabrication advances that increase capacity. The resulting electrodes reach a tensile strength of 1 MPa, which now affords large-format scaling of zinc sponges. The tuned architecture achieves a 102% increase in rechargeable volumetric capacity over previously reported electrodes, yielding 928 $mAh\, cm_{Zn}^{-3}$ in a nickel-zinc battery cycled 150 times with a coulombic efficiency near 100%. These advances in strength, scalability, and rechargeable capacity expand Zn-battery capabilities for a variety of applications including grid storage, personal electronics, and electric vehicles.

Scaling relations from the metal-foam literature (Eq. 1) prompt an alternative route to increase sponge strength by increasing sponge density (Ashby et al. (2000). Metal foams: A design guide (Elsevier)). Sponge tensile strength ($\sigma_T$) is a function of sponge density ($\rho$), a constant (K), and the compressive strength ($\sigma_S$) and density ($\rho_S$) of the solid metal from which the sponge is made.

$$\sigma_T \approx K\sigma_S\left(\frac{\rho}{\rho_S}\right)^{1.5} \qquad \text{Eq. 1}$$

Guided by Eq. 1, the tradeoff between electrode strength and volumetric and gravimetric capacity may be bypassed by appropriately tuning Zn-sponge electrode architectures, consisting solely of Zn and zinc oxide (ZnO), using a fabrication process disclosed herein. If the Zn-sponge electrode is too dense, the electrode will suffer from low internal ionic flux but have high electronic conductivity and mechanical strength. Conversely, if the electrode is too porous, the electrode will suffer from low electronic conductivity and mechanical strength but benefit from high ionic flux. These factors may be balanced to create a high-strength, scalable electrode with high rechargeable capacity and cycle life.

Previous Zn-sponge fabrication protocols relied on emulsions that required the use of a carboxymethyl cellulose (CMC) resin that served two roles—acting as a porogen and serving to increase the viscosity of the emulsion and so maintain suspension of the zinc particles—but at amounts that limited the amount of Zn powder that could be loaded into an emulsion (Ko (2018); Parker (2017); Parker (2016); Parker (2014). *Energy Environ. Sci.*; Parker et al. (2014). Retaining the 3D framework of zinc sponge anodes upon deep discharge in Zn-air cells. *ACS Appl. Mater. Interfaces* 6, 19471-19476). If a higher loading of Zn powder was desired, thereby requiring a given emulsion volume to suspend a greater mass of Zn particles, more of the dual-role CMC would be required. However, adding more of the dual-role CMC also introduces more unwanted porogen and limits the density of the molded sponge form factor. Decoupling the porogenic/thickening roles, namely the use of a porogenic agent plus the use of second agent that thickens the emulsion, allows for separate control of porogen quantity and emulsion viscosity, such that one can more than double the amount of loaded Zn mass with respect to porogen mass found in the literature. The improved emulsion protocol decouples these two roles, thereby permitting higher volume fractions of zinc to be incorporated into the final sponge. As an example, one type of CMC formulation, such as a CMC resin, acts primarily as a porogen while a second, different CMC formulation acts as a thickener. The decoupled CMC combination enables more flexibility in controlling Zn-sponge density for a wide range of Zn particle sizes. Sponge density can also be increased by using longer sintering times and/or apply pressure during baking (hot isostatic pressing), but both alternatives increase manufacturing cost.

The method is performed by forming a mixture comprising: water, a soluble compound that increases the viscosity of the mixture, an insoluble porogen, and metallic zinc powder. Optionally, the mixture may comprise an organic liquid such as decane. The soluble compound may be, for example, a water-soluble carboxymethyl cellulose resin, and the porogen may be, for example, a water-insoluble carboxymethyl cellulose resin. Other examples include sodium dodecyl sulfate (SDS) as the thickener and small polypropylene pellets near 60-μm in diameter as the porogen. Whether these materials are soluble by reference to the water or actual water/organic mixture being used. The mixture is placed in a mold to form a sponge and dried. The drying may be at ambient conditions or with some degree of warming. The warming should not be so high as to cause reactions other than drying the liquids from the sponge. The drying step may not be needed if the sponge has enough physical integrity to be transferred from the mold. This may be the case in the absence of the organic liquid.

Previous Zn-sponge fabrication protocols relied on emulsions that required the use of organic liquids with low-vapor pressure, such as decane. In one embodiment, the Zn sponge (FIG. 1) does not rely on an oil-and-water emulsion. The synthesis is performed by adding preswollen carboxymethyl cellulose, CMC resin to water followed by adding an aliquot of a thickening agent such as medium viscosity CMC sodium salt to the CMC/water solution. The mixture is spatula-stirred until the CMC is fully dissolved, typically over a few minutes. Then zinc powder is added. The paste dries, is baked, and is then ready for use.

In one typical procedure, the proportions are 0.844±0.002 g of preswollen CMC (IonSep CMC 52 BIOPHORETICS™, CAS#9000-11-7) in 6 mL of 18 MΩ cm water to which is added 0.050±0.001 g of the medium viscosity CMC thickener (400-800 cP, 2 wt % in H$_2$O, MilliporeSigma, CAS#9004-32-4); once a uniform mixture is obtained, 50 g of Zn powder is added and the suspension is mechanically stirred. The viscous paste that forms is apportioned into molds that shape the desired form-factor of the final sponge and then air dried. The demolded air-dried zinc/CMC composite then undergoes thermal treatment to form a monolithic, porous ZnO shell-coated Zn sponge.

Important components in this protocol are the use of the medium viscosity CMC thickener, which holds the paste together during drying and initial baking process, in concert with the use of the preswollen CMC porogen, which thermally decomposes during thermal treatment, leaving the structure as gas-phase products and thereby "releases" the void network that is co-continuous with the zinc network. This non-emulsion protocol creates a paste that dries much more quickly than the emulsions prepared by previous protocols (Ko (2018); Parker (2017); Parker (2016); Parker (2014). *Energy Environ. Sci.*; Parker (2014). *ACS Appl. Mater. Interfaces*) and enables much stronger dried Zn-paste forms.

Figure 2:
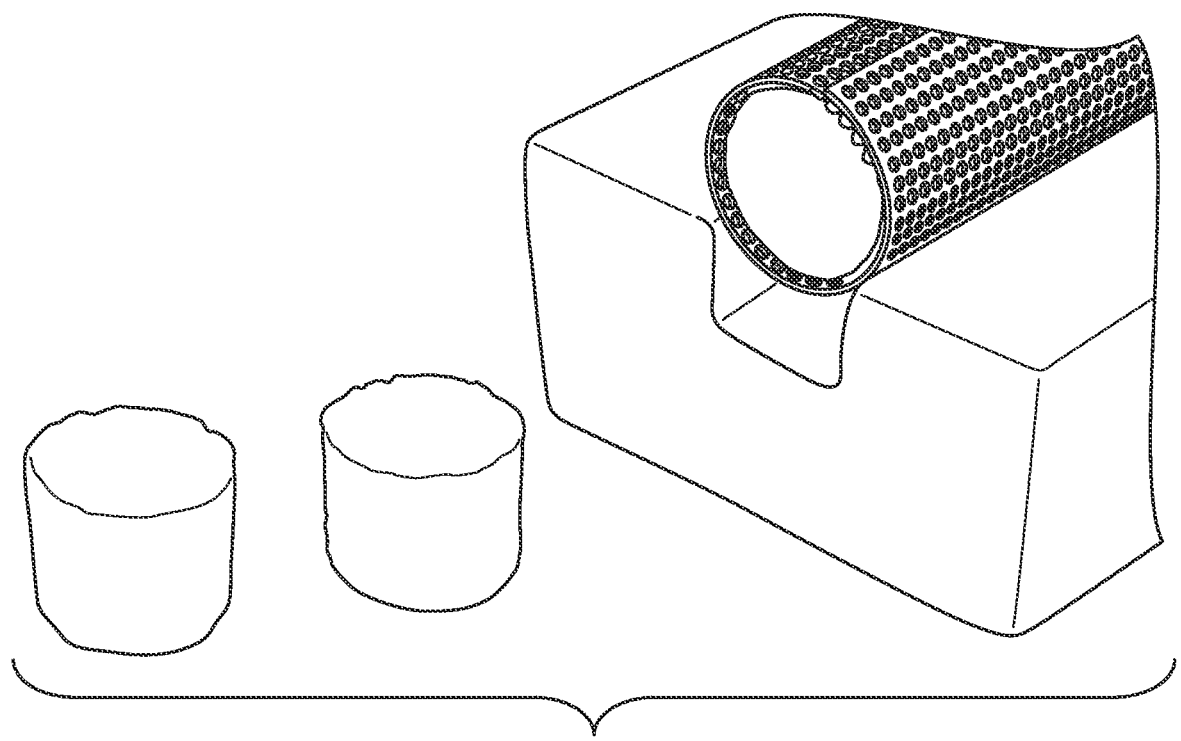
FIG. 2 shows a photograph of a porous metal-mesh casing suspended over a cut-out groove machined into an alumina block. Zn sponges are shown in and outside of the mesh casing

Prior air-dried Zn emulsion-derived forms were baked in a furnace sitting on open, uncovered alumina crucibles. This arrangement induces thermal gradients such that the part of the air-dried sponge closest to the thermally conductive crucible converts a larger quantity of Zn (visually perceived as dark grey) to ZnO (visually perceived as white) than occurs for the top part of the sponge that faces the thermally insulating air. To avoid this undesired, visibly discernable ZnO gradient, the Zn preforms were suspended within porous brass sheets pre-sprayed with boron nitride; for disk-shaped and cylindrical zinc sponges, the metal mesh is bent into a cylindrical casing (FIG. 2). The porous metal cylindrical casing rests on an alumina block with machined-out channels for enhanced gas flow. With the use of this meshed mold (which suspends the dried preforms within the casing) and a grooved alumina crucible, oxygen from the air piped into the furnace is able to uniformly envelop and penetrate the Zn sponges.

In this method, the heating steps are performed with the sponge in a metal mesh positioned to allow air flow through substantially all the openings in the mesh. Some of the openings may be blocked as long as it does not materially affect the overall airflow through the mesh or cause additional non-uniformity in the electrode. The mesh may partially or completely surround the sponge. For example, the mesh may be cylindrical in shape with open ends for inserting and removing the sponge. Other mesh shapes may be used in order to match the shape of the sponge, if desired. The positioning of the mesh minimizes any blocking of the mesh openings by the supporting structure. For example, a cylindrical mesh may be placed in a trough in a substrate that is narrower than the diameter of the cylinder (FIG. 2). The trough is deep enough such that the mesh only touches the upper edges of the tough at most on two lines along the length of the cylinder. The mesh need not be cylindrical. Planar or three-dimensional versions could be constructed based on electrode-shape needs.

Figure 3:
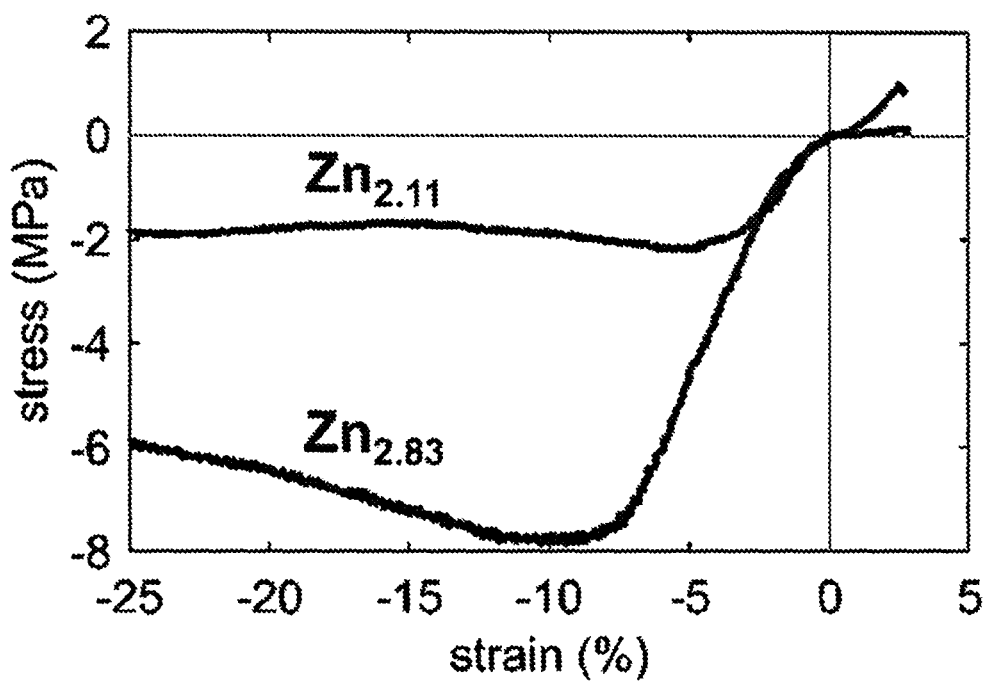
FIG. 3 shows compressive and tensile strength of Zn sponges with different densities. The $Zn_{2.83}$ sponge has both a higher compressive and tensile strength because it is denser than the $Zn_{2.11}$ sponge.
Figure 4:
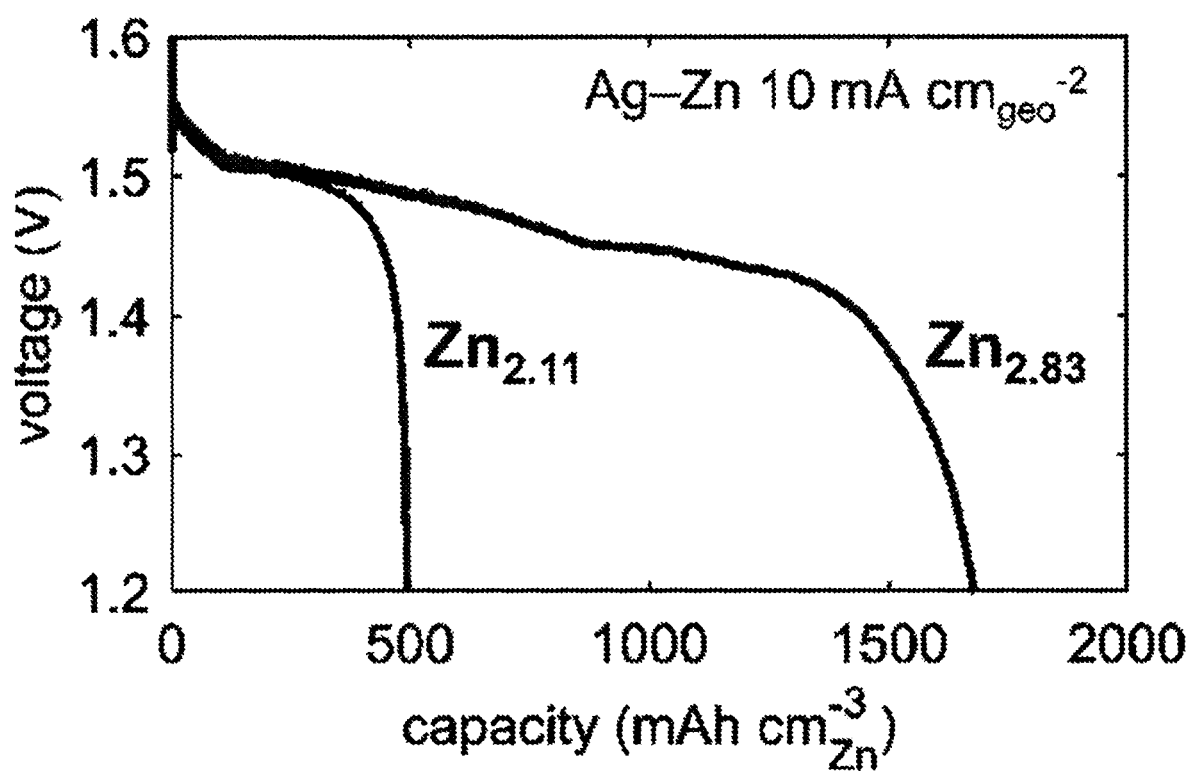
FIG. 4 shows voltage versus volumetric capacity of the Zn electrode in silver-zinc (Ag—Zn) batteries discharged at 10 $mA\, cm_{geo}^{-2}$ using Zn sponge electrodes with different densities.

Prior thermal-treatment protocols yielded thick ZnO shells over the metallic Zn core of the sponge necessitating lengthy electroreduction processes to convert the thermally grown ZnO shell back to Zn metal. Upon full reduction to metal, the Zn-sponge lost significant tensile strength, relative to the ZnO-coated Zn metal (ZnO@Zn) sponge. To obviate the electroreduction step a dense Zn-sponge recipe, the mesh form-fitting casing described above during thermal processing, and appropriate heat treatments (described below) are used to create a Zn-sponge electrode that has a thin shell of ZnO that provides sufficient strength for battery assembly, but which then partially dissolved away once placed in the battery electrolyte so that the electrode is both mechanically strong and in a partially charged state immediately out of the furnace. FIGS. 3 and 4 show the strength of two types of Zn sponges and their discharge capacities. "$Zn_{2.11}$" and "$Zn_{2.83}$" sponges were made wherein the designation refers to their respective density, meaning $Zn_{2.11}$ and $Zn_{2.83}$ have densities of $2.11 \pm 0.06$ g cm$^{-3}$ and $2.83 \pm 0.09$ g cm$^{-3}$, respectively. This increase in strength allows for large-format electrodes in applications where large electrodes are desirable. The scaling relationship between electrode thickness and maximum practical length is shown in FIG. 5.

The first heating step in the inert atmosphere may be performed at a peak temperature of 200 to 420° C. or 350 to 390° C. The second heating step in the oxygen-containing atmosphere may be performed at a peak temperature of 420 to 720° C. or 560 to 610° C. These temperatures refer to the set point or interior temperature of the furnace as opposed to the temperature of the sponge. The ZnO shell and scaffolding can be increased or decreased in size and thickness by tuning the temperature and duration of the Zn-sponges under air. Increasing the ZnO shell/scaffolding boosts electrode strength but decreases electrode capacity, so a balance must be reached depending on the application.

Figure 5:
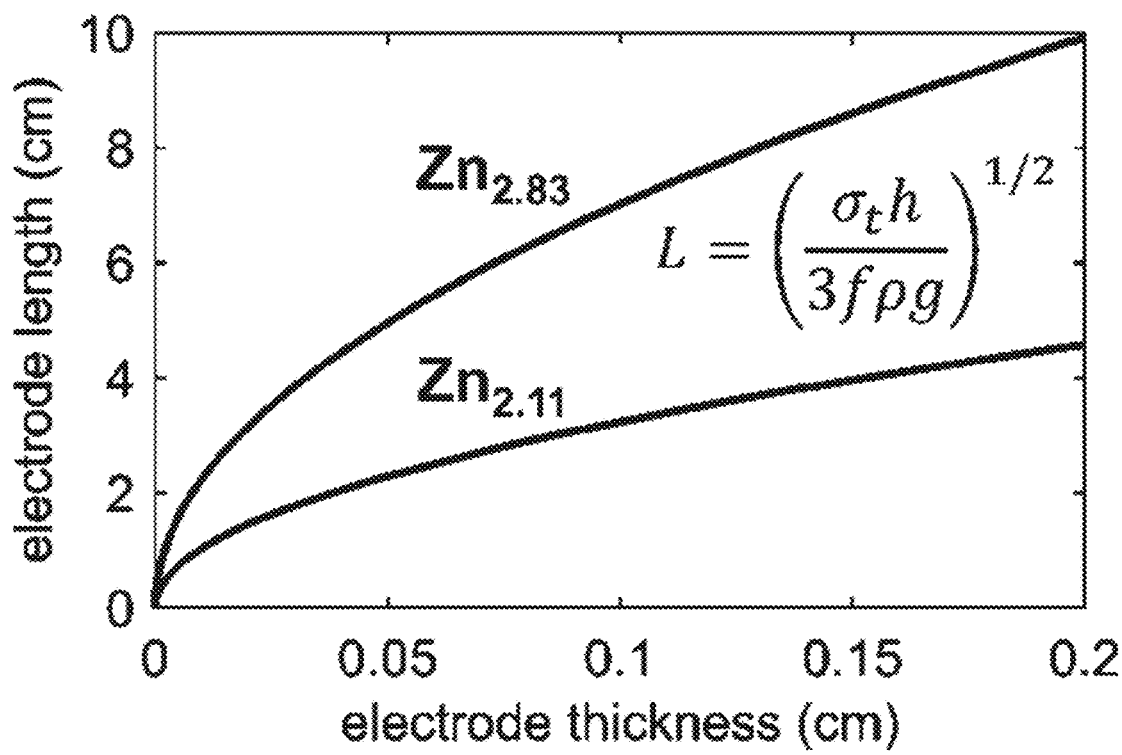
FIG. 5 shows maximum practical electrode side length of a square electrode versus electrode thickness using $Zn_{2.83}$ and $Zn_{2.11}$ sponges.

The scaled-up maximum practical electrode sizes are calculated to be 10×10×0.2 cm and 4.6×4.6×0.2 cm for $Zn_{2.83}$ and $Zn_{2.21}$, respectively (FIG. 5). The denser $Zn_{2.83}$ sponge supports larger electrode areas than $Zn_{2.11}$ because of the greater tensile strength of the $Zn_{2.83}$ sponge (FIG. 4). The large electrode size afforded by $Zn_{2.83}$ enables the use of less packaging for battery systems where multiple cells or batteries must be connected in series and/or parallel and thereby boosts system energy density. As a conservative estimate of maximum practical electrode side length for a square-shaped sponge electrode, the electrode side length as a function of electrode thickness is calculated such that if an electrode were clamped on one of its edges in a cantilevered manner, the electrode would experience half the allowable tensile strength induced by bending. Tensile strength is used because the measured tensile strengths were less than the measured compressive strengths indicating that the electrodes are more prone to failure under tension than compression (FIG. 3). Maximum practical electrode side length (L) is a function of tensile strength ($\sigma_t$), electrode thickness (h), factor of safety (f), which for this purpose is equal to 2, sponge density ($\rho$), and the acceleration of gravity (g) as shown in Eq. 2.

$$L = \left(\frac{\sigma_t h}{3 f \rho g}\right)^{1/2} \quad \text{Eq. 2}$$

These methods, when used together or separately, may make a zinc electrode having a density of at least 1.0 g cm$^{-3}$, 1.5 g cm$^{-3}$, 2.0 g cm$^{-3}$, 2.5 g cm$^{-3}$, 2.75 g cm$^{-3}$, 3.0 g cm$^{-3}$, or 3.25 g cm$^{-3}$. It may also comprise no more than 10, 50, 75, or 99 wt. % ZnO. The zinc electrode may be used in an electrochemical cell comprising: an anode current collector, the zinc electrode in electrical contact with the anode current collector, an electrolyte, a cathode current collector, a cathode in electrical contact with the anode current collector, and a separator between the zinc electrode and the cathode.

Figure 6:
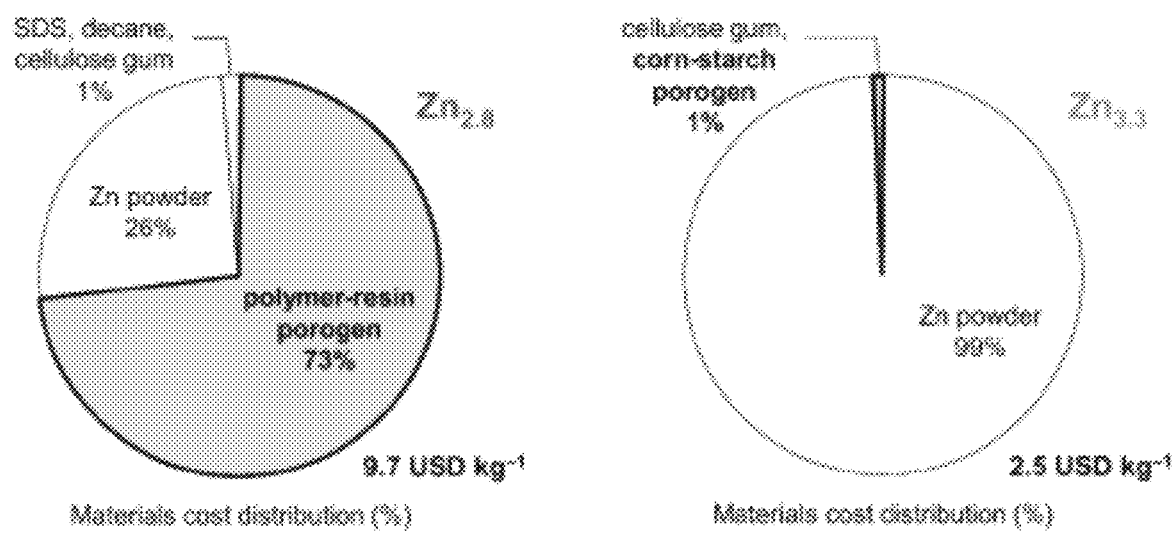
FIG. 6 shows materials cost distribution of $Zn_{2.8}$ and $Zn_{3.3}$ sponges.

In another embodiment, a more sustainable version of a battery may be made (Hopkins et al. (2020). "Low-cost green synthesis of zinc sponge for rechargeable, sustainable batteries" *Sustainable Energy & Fuels*. 4, 3363-3369). Disclosed is a green synthesis for Zn sponge that reduces materials cost by 74% to 2.5 USD kg$^{-1}$. Previously reported protocols to fabricate Zn sponge require a polymer-resin porogen that accounts for at least 73% of the materials cost of 9.7 USD kg$^{-1}$ (FIG. 6). In this embodiment no emulsion is required for synthesis, obviating the need for hazardous hydrocarbons. Corn starch (0.3 USD kg$^{-1}$) may be substituted for polymer-resin porogens (CMC: 420 USD kg$^{-1}$).

The low-cost green synthesis of Zn sponge consists of four steps, which require no humidity control for fabrication, unlike lithium-based chemistries. First, water, corn starch, cellulose gum, and Zn powder are mixed together. Corn starch acts as the porogenic filler and burns out during baking to yield a void network throughout the volume of the sponge. Cellulose gum acts as a thickener that suspends the Zn particles in the aqueous mixture. Second, the mixture is vortexed and stirred. Third, the resulting Zn paste is pressed into the cavities of the mold. The Zn sponges may be made with a form factor relevant for AA batteries. Other cavity shapes can be accommodated by machining the Zn sponge directly or by modifying the mold. The mold is heated at 60° C. to dry the Zn paste and to expand the cavities for demolding the Zn-paste preforms. Fourth, the dried Zn preforms are transferred to a mesh casing suspended by a notched alumina block for baking in a tube furnace under nitrogen ($N_2$) and air (FIG. 2). The suspended mesh casing enables uniform baking of the sponge cylinders.

The methods, electrodes, and cells described herein may incorporate any features disclosed in U.S. Pat. Nos. 9,802, 254; 10,008,711; and 10,720,635 and US Pat. Appl. Pub. Nos. 2017/0331104, 2017/0338479, and 2019/0173141.

The following examples are given to illustrate specific applications. These specific examples are not intended to limit the scope of the disclosure in this application.

Fabricating Tunable Zn-Sponge Electrodes

The Zn-sponge fabrication process presented here differs from past methods by revisions to the emulsion recipe, baking protocol, and heating configuration. For context, Zn sponges are generally made in the following manner (Parker (2017); Ko (2018); Parker (2016); Parker (2014). *ACS Appl. Mater. Interfaces*; Parker (2014). *Energy Environ. Sci.*; U.S. Pat. Nos. 9,802,254 and 10,008,711; Stock (2018). *ACS*

Figure 7:
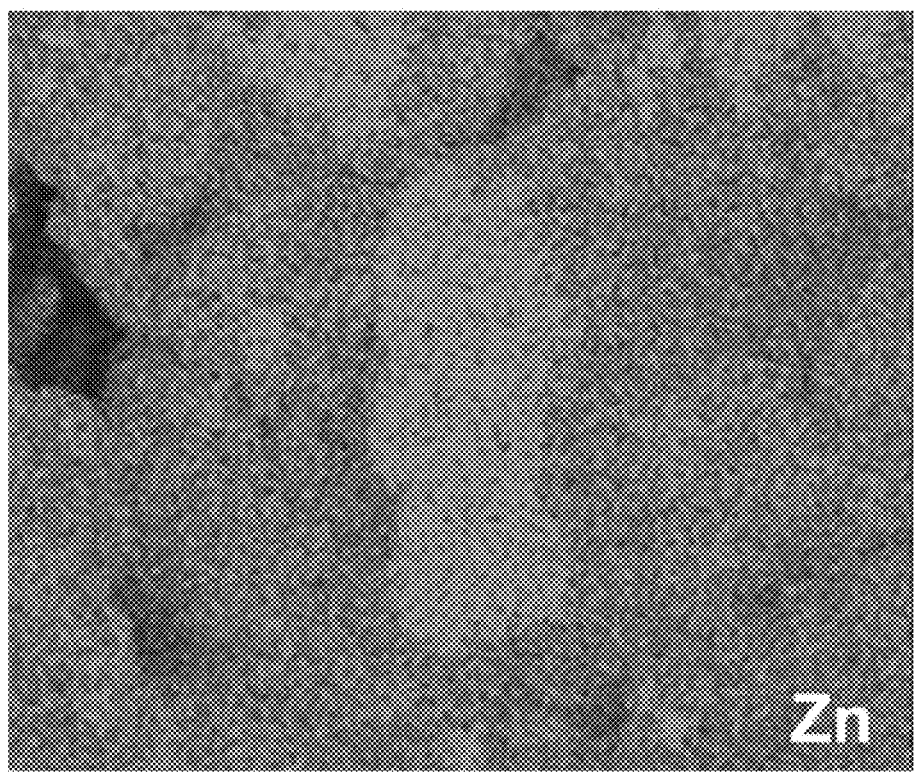
FIG. 7 shows elemental mapping of the same location in FIG. 13 showing the distribution of Zn.
Figure 8:
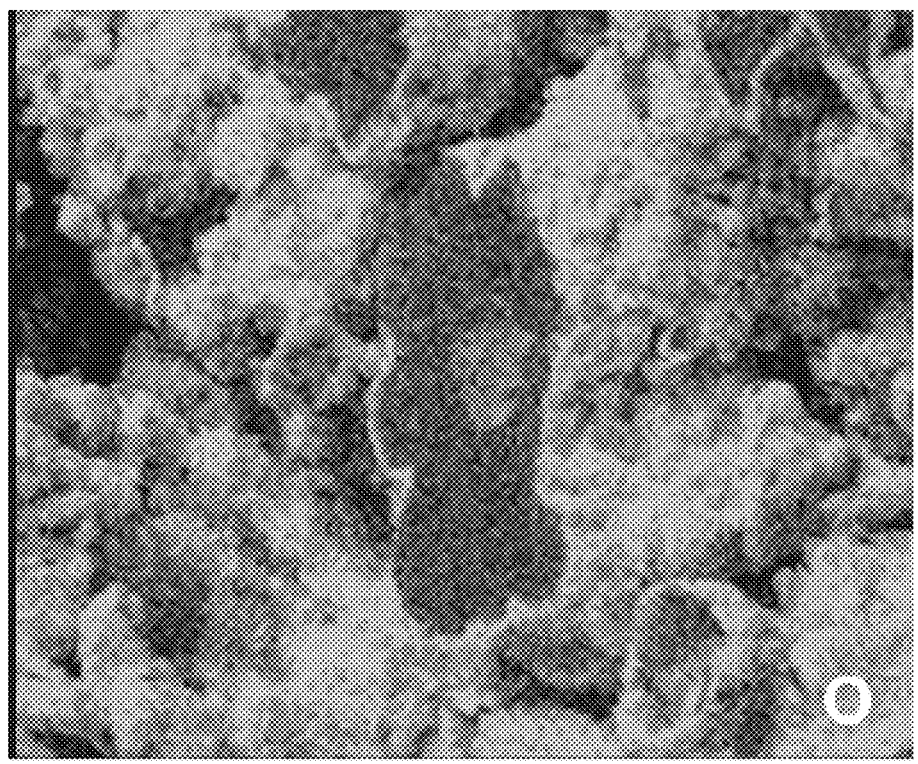
FIG. 8 shows elemental mapping of the same location in FIG. 13 showing the distribution of 0.

*Appl. Mater. Interfaces*; Drillet et al. (2010). Development of a novel zinc/air fuel cell with a Zn foam anode, a PVA/KOH membrane and a $MnO_2$/SiOC-based air cathode. *ECS Trans.* 28, 13-24). An emulsion is created that contains a porogen into which zinc powder is mixed. The resulting paste is portioned into drying molds and dried overnight. The Zn preforms are placed on an alumina tray and transferred to a furnace for baking. During heating below the melting point of Zn (419.5° C.) while under an inert gas such as nitrogen, the porogen burns out and Zn particle-to-particle annealing begins. Air is then piped into the furnace as temperature is ramped above the melting point of Zn. This step produces a strong, shape-constraining, thermally formed ZnO layer (FIGS. 7 and 8) beneath which the Zn particles fuse together to form a nonperiodic Zn-sponge architecture.

The emulsion recipe used below tolerates a higher volume fraction of Zn in the sponge than previous recipes without relying on small or hollow Zn particles that can accelerate corrosion (Li et al. (2014). Recent advances in zinc-air batteries. *Chem. Soc. Rev.* 43, 5257-5275; Li et al. (2017). Metal-air batteries: Will they be the future electrochemical energy storage device of choice?. *ACS Energy Lett.* 2, 1370-1377; Yi et al. (2018). Challenges, mitigation strategies and perspectives in development of zinc-electrode materials and fabrication of rechargeable zinc-air batteries. *Energy Environ. Sci.* 11, 3075-3095). More Zn is packed into a given volume of emulsion by using two types of carboxymethyl cellulose (CMC). The first is a water-insoluble resin that primarily acts as a porogen with some thickening capability. The second is water-soluble and primarily acts as a thickener. Previously reported recipes typically rely solely on CMC resin (Parker (2017); Ko (2018); Parker (2016); Parker (2014). *ACS Appl. Mater. Interfaces*; Parker (2014). *Energy Environ. Sci.*). Large (50 µm), solid Zn particles require more CMC resin to suspend than smaller and/or porous Zn particles, but adding more CMC resin increases porogen fraction and thereby limits sponge density. By using a CMC mixture that decouples porogen quantity and emulsion viscosity, the amount of loaded Zn mass can be more than doubled with respect to porogen mass found in previous fabrication procedures (Ko (2018); Parker (2014). *Energy Environ. Sci.*) and derive greater control of the Zn-sponge architecture than what was achievable using past emulsion recipes. Sponge density can also be increased while maintaining sufficient porosity by using longer heating times or applying pressure during baking (hot isostatic pressing), but either increases manufacturing cost (Kalpakjian et al. (2014). Manufacturing engineering and technology, 7th edition (Pearson)).

Figure 9:
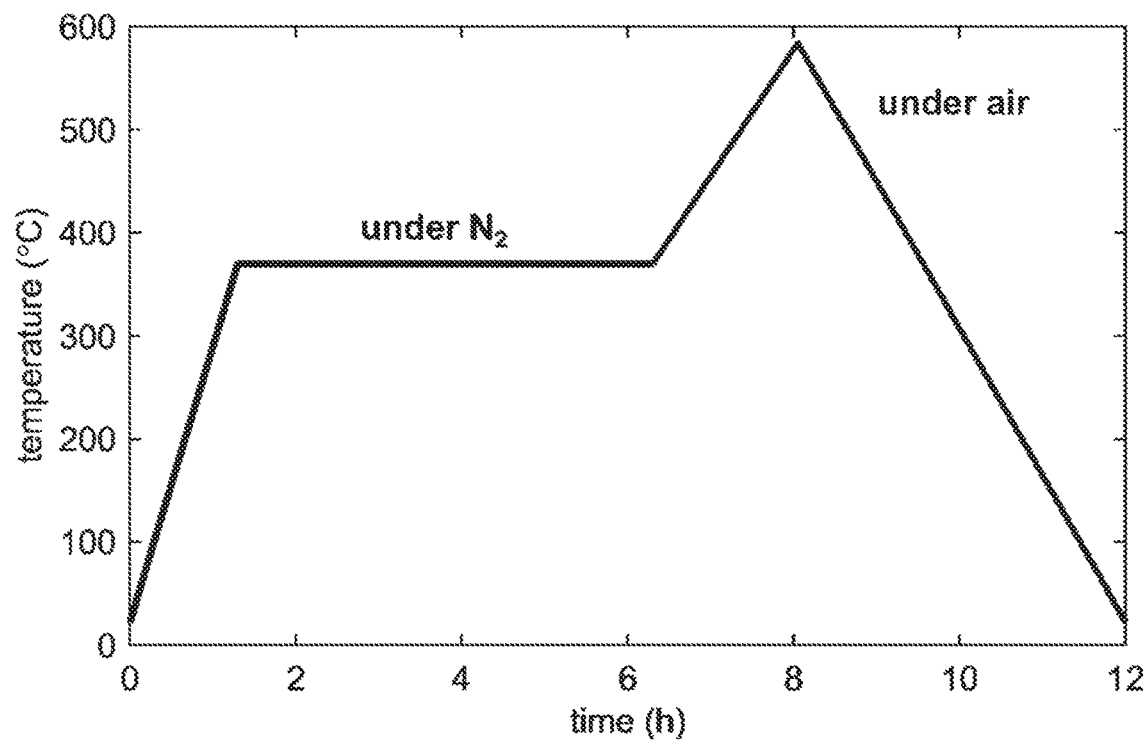
FIG. 9 shows a baking profile of temperature and atmosphere versus time profile used to bake Zn-sponge preforms.
Figure 10:
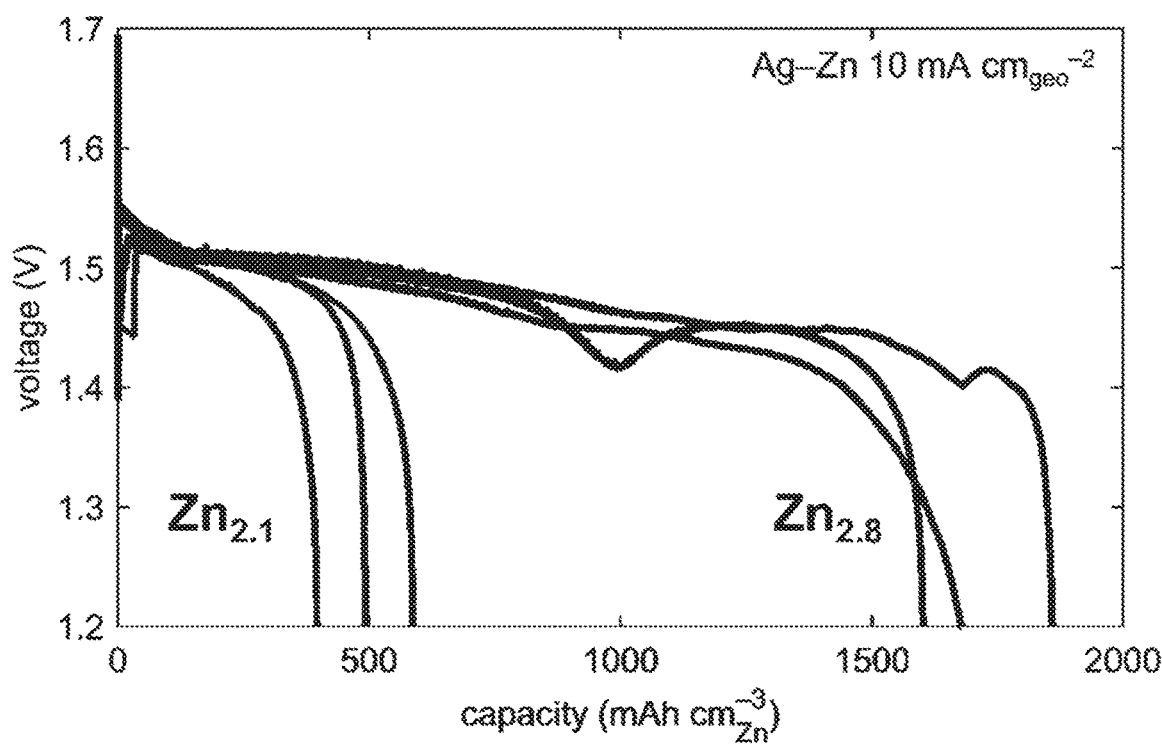
FIG. 10 shows volumetric capacity of Zn in Ag—Zn cells.
Figure 11:
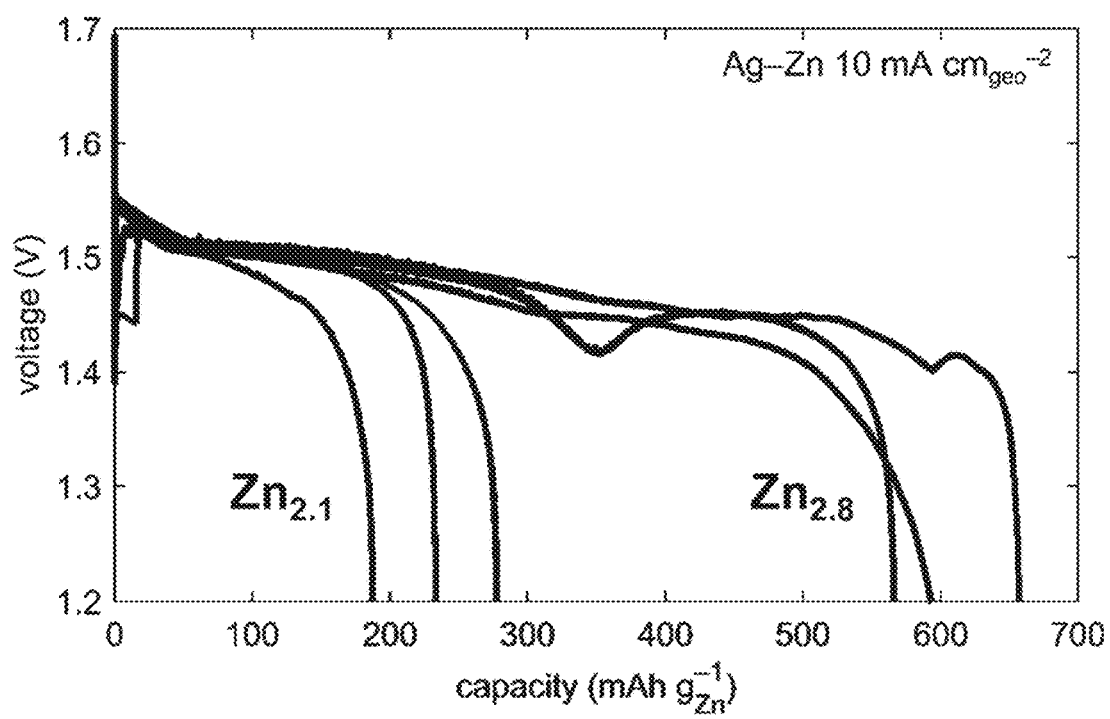
FIG. 11 shows gravimetric capacity of Zn in Ag—Zn cells.

A baking protocol (FIG. 9) is used to densify Zn preforms while growing a ZnO shell that provides mechanical strength for improved durability (FIG. 3) without compromising volumetric or gravimetric capacity (FIGS. 4, 10, and 11). Past heat treatments thermally oxidize excessive amounts of Zn to ZnO, necessitating an energy-intensive, time-consuming "recharge", i.e., electroreducing thermally grown ZnO to Zn before battery assembly (Parker (2014). *Energy Environ. Sci.*). The electrochemical recharge reduces the tensile and compressive strengths of the sponge, making battery assembly with large electrodes challenging. The need for electroreduction is avoided by thermally forming an appropriate amount of ZnO on the surface such that the sponge is both mechanically strong (FIG. 3) and in a mostly charged, Zn-rich, state immediately out of the furnace (FIG. 4).

The heating configuration uses metal mesh casings and notched alumina holders to promote uniform ZnO formation (FIG. 2). Placing Zn sponges directly on thermally conductive alumina trays induces temperature gradients that create corresponding ZnO gradients throughout the sponge thickness. Such thermal gradients can also induce hot cracking in the sponges (Beer et al. (2009). Mechanics of materials, fifth edition (McGraw-Hill)). To avoid these undesired effects, the cylindrical Zn preforms are encased in cylindrical brass meshes (precoated with boron nitride) that rest on notched alumina blocks (FIG. 2). The notches in the alumina blocks enhance gas flow around the Zn preforms.

Pouring Zn powder into a solid metal mold for heating, as an alternative fabrication process, poses several challenges. For example, when ZnO thermally grows on Zn, the sponge expands due to the low density of ZnO relative to Zn. When processed in a solid metal mold, the sponge can bind to the mold even with the use of release agents and generous draft angles of 45°. Releasing a sponge from a solid metal mold typically requires forces that can fracture the sponge, prompting the switch to mesh casings.

Fabrication of Zn Sponges

A 2.054 mL aliquot of deionized water was added to 4.565 mL of decane to which 0.100±0.002 g of sodium dodecyl sulfate (SDS) was added. To this mixture, 0.0050±0.0003 g of medium viscosity water-soluble (400-800 cP, 2 wt % in $H_2O$ at 25° C.) carboxymethylcellulose (CMC) sodium salt (MilliporeSigma, CAS#9004-32-4) was added and stirred by hand until the CMC dissolves, which can take a few minutes. To this mixture, 0.844±0.002 g of water-insoluble IonSep CMC 52 preswollen carboxymethyl cellulose resin (BIO-PHORETICS™, CAS#9000-11-7) was added. The water-soluble CMC is a thickening agent while the water-insoluble CMC resin is primarily a porogen with some thickening capability. The suspension was stirred at 1000 rpm for 5 min using an overhead stirrer. Use of only polymer or polymer-coated stirring tools is strongly recommended. It was observed metal stirring tools can adversely affect Zn-sponge outcomes. Zinc powder with an average particle size of 50 µm (89.2% of particles <75 µm and 0% of particles >250 µm) containing 307 ppm of bismuth and 307 ppm of indium for corrosion suppression was added to the emulsion while the mixture was continuously stirred for an additional 5 min. The paste was outgassed by placing the mixture under vacuum for 5 min.

The degassed Zn paste was portioned into polypropylene drying molds and left to dry in open air overnight. The following day, Zn preforms were placed into a mesh casing (FIG. 2), which was then set on a notched alumina holder (FIG. 2) in a tube furnace. Nitrogen ($N_2$) gas was piped into the tube furnace at a rate of 200 mL $min^{-1}$ for 30 min to purge the furnace of air. After 30 min of purging, $N_2$ was throttled to a constant rate of 100 mL $min^{-1}$ and the temperature was increased to 369° C. over the course of 68 min equaling a ramp rate of 5° C. $min^{-1}$ (FIG. 9). Temperature was held at 369° C. for 5 h after which $N_2$ flow was stopped and breathing air was immediately piped in at 100 mL $min^{-1}$. At this time, the temperature was linearly raised from 369° C. to 584° C. over 105 min, equaling a ramp rate of 2° C. $min^{-1}$. After reaching 584° C., the tube furnace was powered off and cooled to room temperature over 4 h without active-cooling control. Once cooled, the Zn sponges were sliced with a diamond saw and sanded down with sandpaper to create multiple electrodes (FIG. 2).

Figure 12:
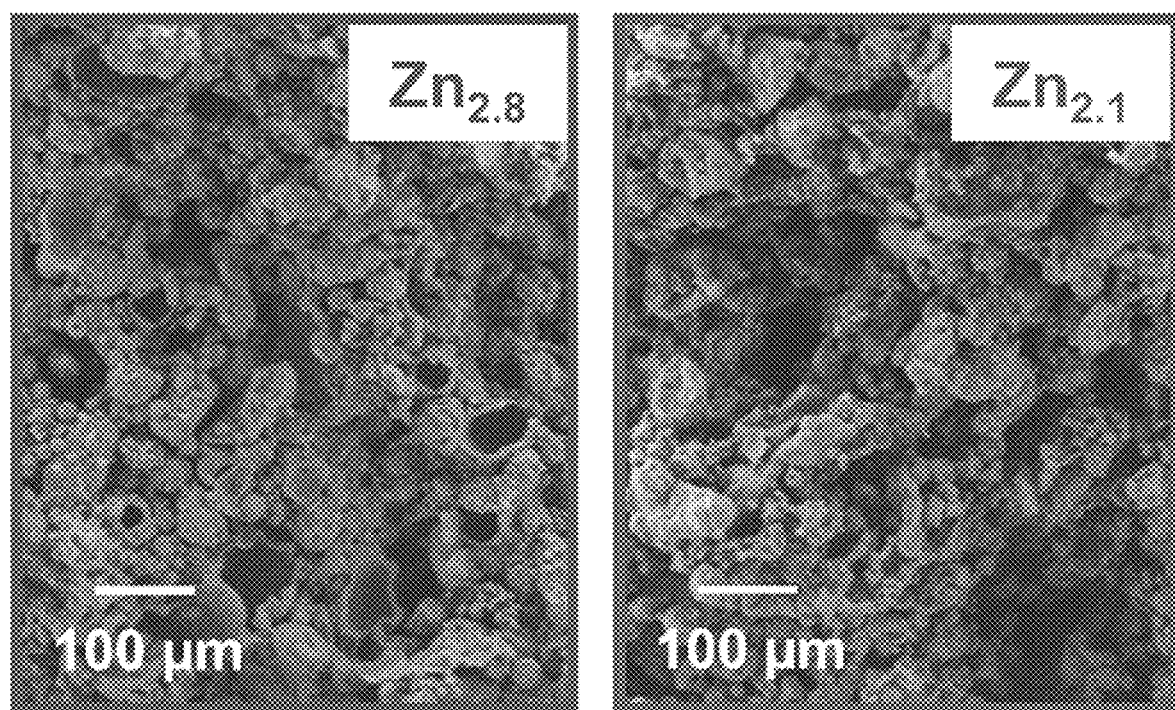
FIG. 12 shows scanning electron micrographs of cross-sectioned $Zn_{2.8}$ (left) and $Zn_{2.1}$ (right).

To measure the mechanical and electrochemical properties of Zn sponges with varying density, "$Zn_{2.1}$" and "$Zn_{2.8}$" sponges were created with respective densities of 2.11±0.06 g cm$^{-3}$ and 2.83±0.09 g cm$^{-3}$. The sponge density was determined by weighing cylindrical monoliths (FIG. 2) and measuring their dimensions. The standard deviations are based on three measurements of three sponge samples of each type. An emulsion volume of 10 mL is used with 20 or 50 g of 50-μm-diameter Zn powder to create $Zn_{2.1}$ or $Zn_{2.8}$, respectively. The $Zn_{2.1}$ density is comparable to the densest Zn sponges (2.1 g cm$^{-3}$) previously reported (Ko (2018)). The $Zn_{2.8}$ sponge nears a practical maximum density for this study's emulsion recipe, baking protocol, and Zn particle size. If more 50-μm Zn particles (>55 g) are added to 10 mL of emulsion, the resulting Zn paste poorly fills the drying molds and crumbles easily during demolding, resulting in lower sponge density than when 50 g of 50-μm Zn powder is used. While the difference between $Zn_{2.1}$ and $Zn_{2.8}$ may seem subtle based on their cross-sectional micrographs (FIG. 12) and 34% difference in density, these architectural subtleties yield substantial consequences for capacity, strength, and scalability.

Microscopic Analysis of Cross-Sectioned $Zn_{2.8}$ Sponge

Figure 13:
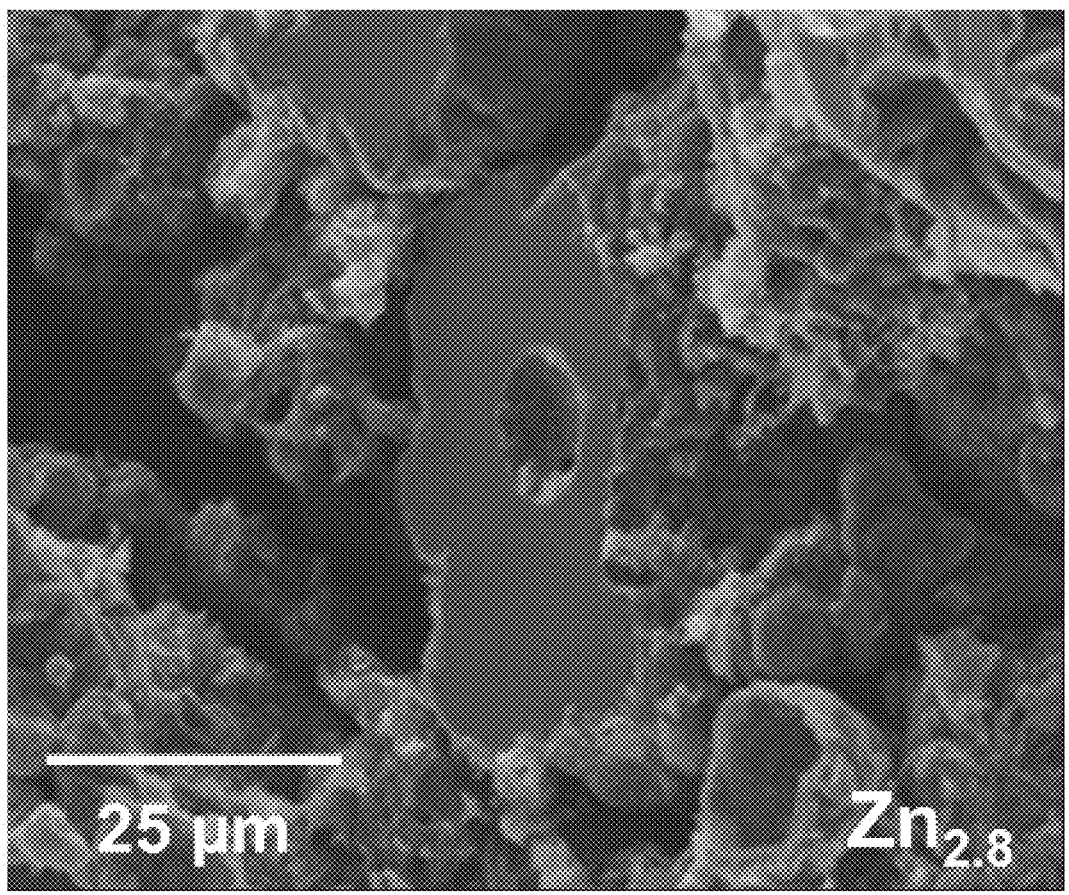
FIG. 13 shows a scanning electron micrograph of cross-sectioned $Zn_{2.8}$ before electrochemical cycling.

A scanning electron micrograph of a cross-sectioned $Zn_{2.8}$ sponge qualitatively confirms that the Zn particles fuse together (FIG. 13); this cross section also captures the smooth interior of Zn particles that terminate with a rough exterior ZnO shell, an assignment energy-dispersive X-ray spectroscopy (EDS) verifies. The EDS maps of zinc (FIG. 7) and oxygen (FIG. 8) show that the cross-sectioned Zn particles are filled with Zn and coated by a 0.5-μm layer of oxygen from ZnO. The fused nature of the Zn particles is further substantiated by tensile strength measurements described below.

Silver-Zinc Cells

A transparent battery casing made of acrylic with ethylene propylene diene monomer (EPDM) rubber gaskets was fabricated by laser cutting (FIG. 14) (Hopkins (2013). Mechanical design of flow batteries. Master's thesis. Massachusetts Institute of Technology; Hopkins (2018). Stopping self-discharge in metal-air batteries. Doctoral dissertation. Massachusetts Institute of Technology). The transparent casing aids in leak detection and other operando observations (Hopkins et al. (2018). Suppressing corrosion in primary aluminum-air batteries via oil displacement. *Science.* 362, 658-661; Chen et al. (2016). A low-dissipation, pumpless, gravity-induced flow battery. *Energy Environ. Sci.* 9, 1760-1770). The bolts and acetal dowel pins allow for easy assembly and disassembly. The "separator assembly" (FIG. 14) for the Ag—Zn cells consisted of one layer of CELGARD® 3501 on the Zn-anode side, followed by two layers of cellophane (Innovia Films), with one layer of 700/28 Freudenberg separator on the Ag-cathode side. The current collector on the Zn-anode side was tin foil while the current collector on the Ag-cathode side was a coiled platinum wire. The electrolyte was 9 M potassium hydroxide (KOH). The Ag cathode was created to exceed the capacity of the Zn and was prepared by sandwiching a silver mesh between silver oxide powder (MilliporeSigma, CAS#11113-88-5) that was predominately silver(II) oxide (AgO). The AgO powder and Ag mesh were pressed at 13.8, 27.6, 41.4, and then 48.3 MPa for 1 min at each pressure. The Zn sponge, separator assembly, and Ag cathode were vacuum infiltrated for 30 min with electrolyte immediately before battery assembly and testing. The Ag—Zn discharge tests at 10 mA $cm_{geo}^{-2}$ were performed at least three times for $Zn_{2.8}$ and $Zn_{2.1}$ (FIGS. 10 and 11) with associated standard deviations calculated from these three trials. The Zn-sponge electrodes were 1 mm in thickness and 11 mm in diameter.

Diametral and Uniaxial Compression Tests

Figure 15:
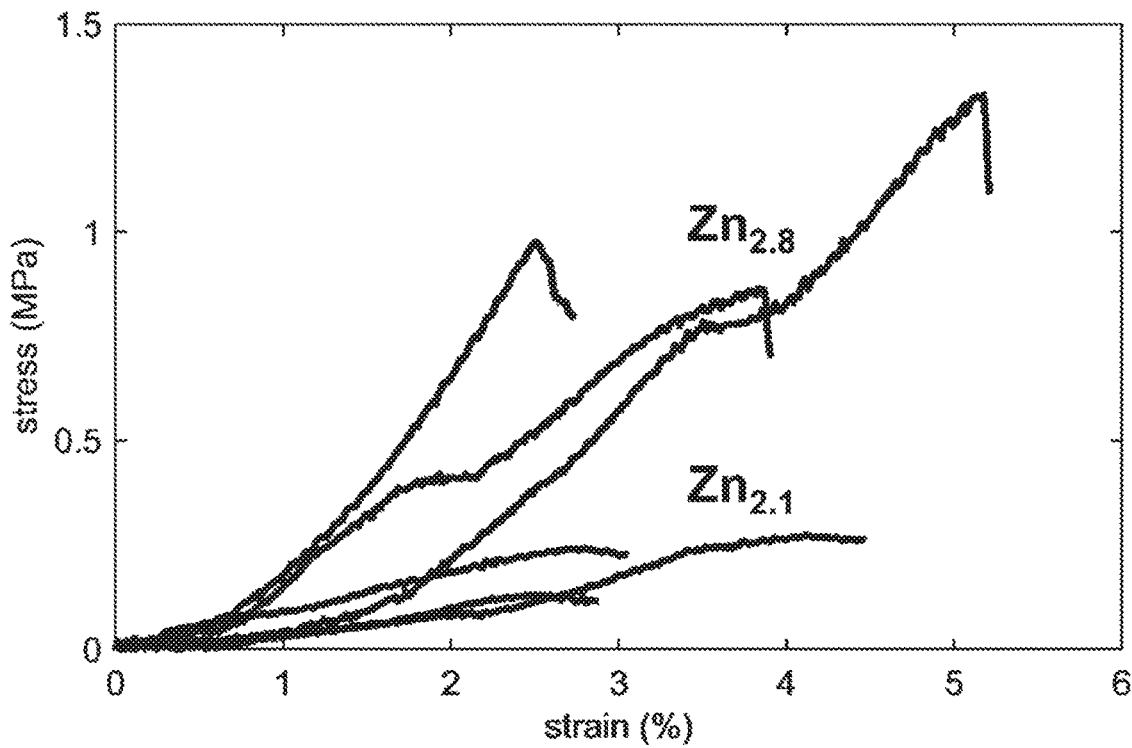
FIG. 15 shows tensile stress versus strain for Zn sponges.
Figure 16:
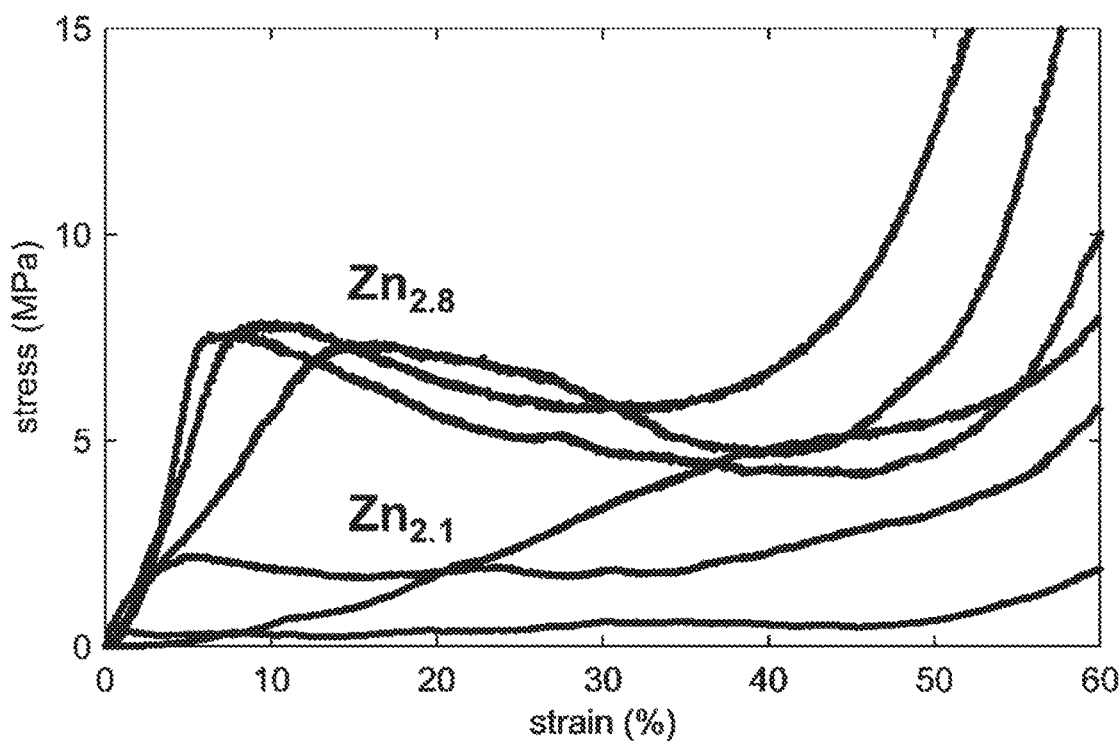
FIG. 16 shows compressive stress versus strain for Zn sponges.

Both diametral and uniaxial compression tests were performed using a constant displacement of 1 mm min$^{-1}$. The surfaces of the crushing plates were not lubricated. The diameter of cylindrical samples used in both tests was 11 mm with thickness of 4 mm for uniaxial compression and between 4 to 6 mm for diametral compression. Diametral compression results were used to calculate tensile stresses and strains (Berenbaum et al. (1959). Measurement of the tensile strength of brittle materials. *Br. J. Appl. Phys.* 10, 281; Fahad (1996). Stresses and failure in the diametral compression test. *J. Mater. Sci.* 31, 3723-3729). Both types of compression testing were performed at least three times for $Zn_{2.8}$ and $Zn_{2.1}$ (FIGS. 15 and 16) with associated standard deviations calculated from those three trials.

Nickel-Zinc Cells

Figure 14:
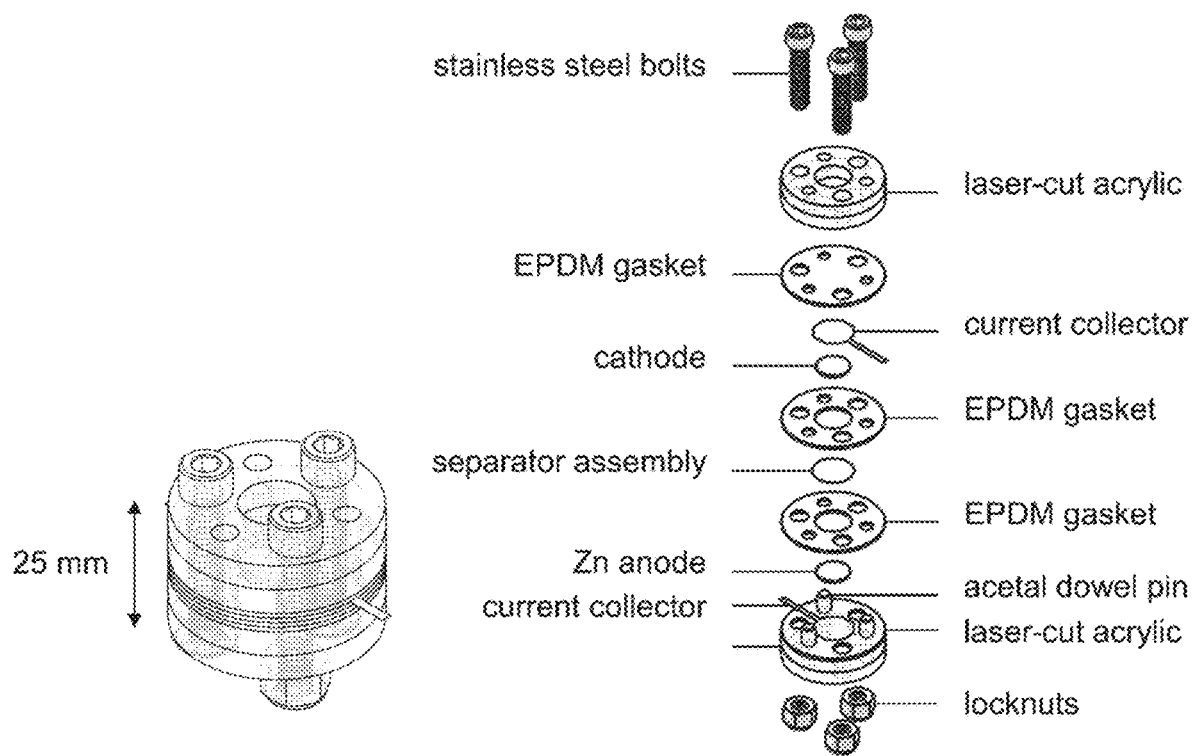
FIG. 14 shows the assembly of a battery cell.

Nickel-Zn cells were made using the same casings as the Ag—Zn cells (FIG. 14). The "separator assembly" consisted of one layer of CELGARD® 3501 on the Zn-electrode side with one layer of 700/28 Freudenberg separator on the Ni-electrode side. Additionally, a 700/28 Freudenberg separator was placed above the Ni-electrode current collector to act as an electrolyte reservoir. The current collector on the Zn-electrode side was tin foil while the current collector on the Ni-electrode side was an expanded Ni foil (Dexmet). The Ni electrode was created by harvesting Ni electrodes from freshly charged PANASONIC® ENELOOP™ Ni—MH AA batteries. The Ni electrodes were harvested by sawing the caps off the ENELOOP™ AAs with a handheld-electric rotary saw. The AAs were then sliced across their longest dimension through one side of the cylinder casing. The electrode assembly was taken out and unraveled from which the Ni-electrode was removed. The Ni-electrode was flattened with a lead brick and cut into small circles using a punch. For this study, three Ni-electrode sheets were used to match the capacity of one 11-mm diameter, 1-mm thick Zn electrode. The three Ni-electrode sheets were wrapped in expanded Ni foil (Dexmet). The current collector for the Ni electrode was the same expanded Ni foil (Dexmet). The Zn sponge was vacuum infiltrated with a solution of 6 M KOH/1 M LiOH in which 11 wt % Ca(OH)$_2$ was suspended while the separator assembly and Ni-electrode were infiltrated with a solution of 6 M KOH/1 M LiOH before cell assembly and cycling. The presence of Ca(OH)$_2$ at the anode decreases zincate solubility, thus helping to reduce shape change (Parker (2016)). The Zn-sponge electrodes were between 0.5 and 1 mm thick for long-term cycling.

Figure 17:
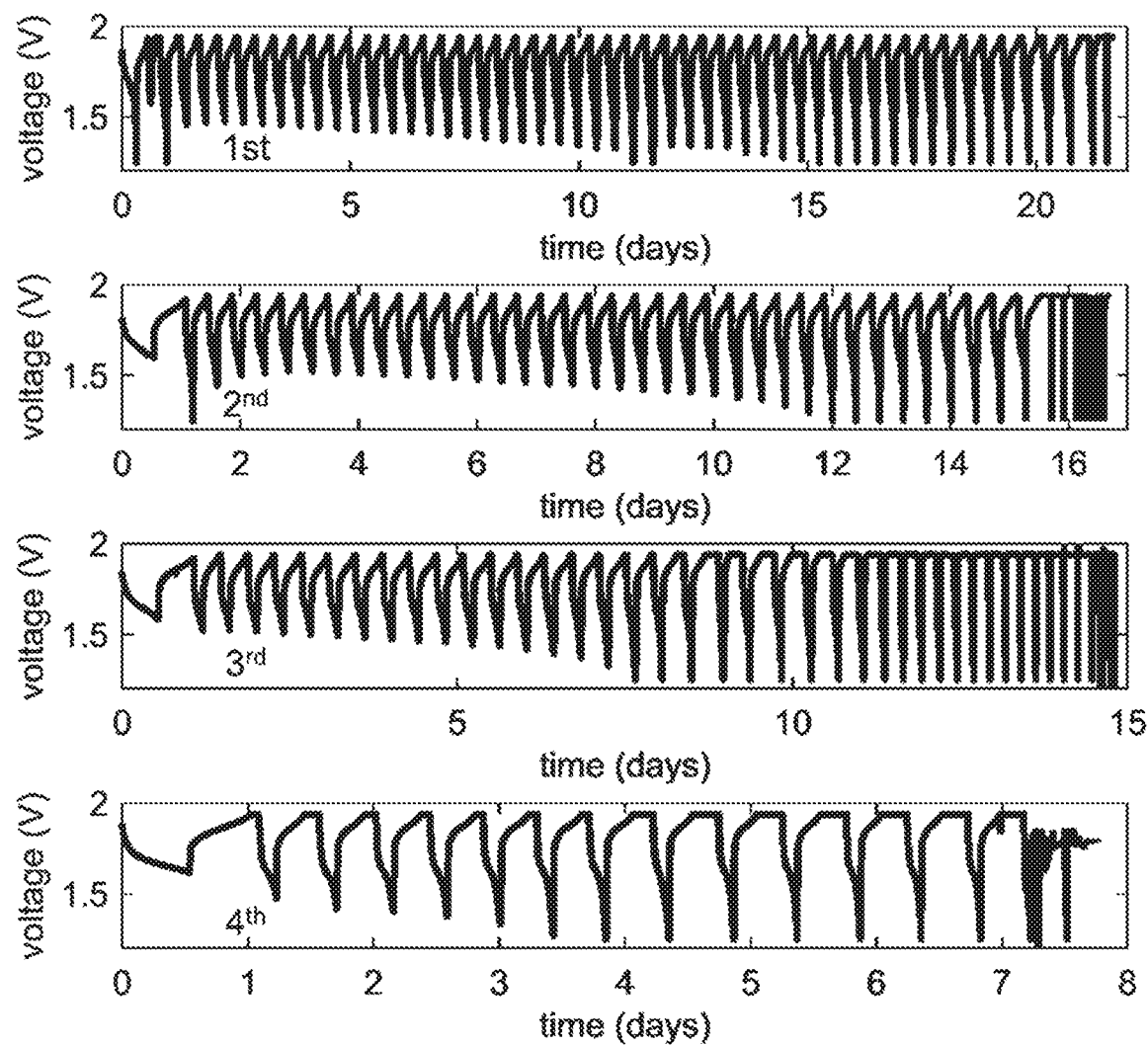
FIG. 17 shows voltage versus time of $Zn_{2.8}$ sponge in a Ni—Zn cell.

To prepare Ni—Zn cells, an electrolyte volume was used that was approximately equal to the volume of the porous electrodes and separators, wherein the volume of electrolyte rested in the pores of the separators and electrodes. The Ni—Zn cell was discharged at 20 mA $cm_{geo}^{-2}$ and charged at 10 mA $cm_{geo}^{-2}$ between 1.25 and 1.94 V. During continuous charging, if 1.94 V was reached, constant voltage charging at 1.94 V commenced to ensure a fixed-charge capacity. If constant voltage charging fell short of the desired capacity after 5 h, discharge commenced and capacity fade occurred in subsequent cycles. Before high-rate cycling started, discharging and charging at 5 mA $cm_{geo}^{-2}$ was used as a break-in procedure for each new Ni-electrode and separator assembly (FIG. 17) (Parker (2017)).

Increasing Zn-Sponge Electrode Capacity, Strength, and Scalability

Figure 18:
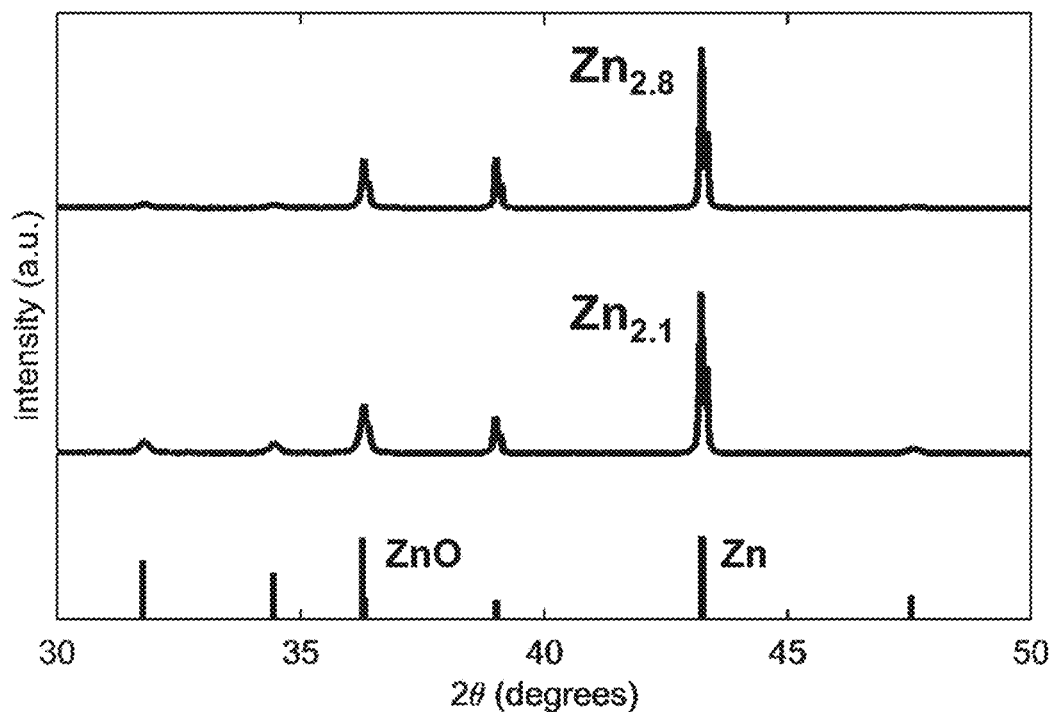
FIG. 18 shows X-ray powder diffraction of $Zn_{2.8}$ and $Zn_{2.1}$.

A complete discharge of $Zn_{2.8}$ in a silver-zinc (Ag—Zn) cell (FIG. 14) reaches a volumetric capacity of 1712±144 mAh $cm_{Zn}^{-3}$ (per cubic centimeter of sponge) delivered at 10 mA $cm_{geo}^{-2}$ (per geometric area of sponge). In contrast, $Zn_{2.1}$ reaches 490±96 mAh $cm_{Zn}^{3}$ under the same conditions (FIG. 10). The 3.5-times increase in volumetric capacity from $Zn_{2.1}$ to $Zn_{2.8}$ arises from differences in both gravimetric capacity and sponge density. After discharge to 1.2 V, the gravimetric capacity of $Zn_{2.8}$ and $Zn_{2.1}$ per gram of Zn-sponge electrode (i.e., the masses of Zn, ZnO, but not infiltrated electrolyte) is 605±47 mAh $g_{Zn}^{-1}$ and 232±45 mAh $g_{Zn}^{-1}$, respectively (FIG. 11). To calculate volumetric capacity, gravimetric capacity is multiplied by sponge density, thus further widening the volumetric-density performance gap between $Zn_{2.8}$ and $Zn_{2.1}$ sponges. The $Zn_{2.8}$ sponge has a higher gravimetric capacity than $Zn_{2.1}$ under the same baking protocol because of the higher volume-to-surface-area ratio of $Zn_{2.8}$, which limits the amount of Zn that converts to ZnO during baking. This assertion is supported with X-ray powder diffraction (XRD) analyses, which indicate that $Zn_{2.8}$ and $Zn_{2.1}$ consist of 70 and 50% Zn, respectively, with the remainder being ZnO (FIG. 18). By modifying baking parameters, the gravimetric capacity of $Zn_{2.1}$ could be increased to match the gravimetric capacity of $Zn_{2.8}$, but $Zn_{2.8}$ sponges would still have a higher volumetric capacity.

To quantify the scaling limits of Zn sponges for use as thin-sheet electrodes, tensile strengths of 1.06±0.24 MPa and 0.27±0.14 MPa (FIG. 15) and compressive strengths of 5.86±0.79 MPa and 1.56±1.06 MPa (FIG. 16) for $Zn_{2.8}$ and $Zn_{2.1}$, respectively were measured (FIG. 3). Tensile strengths were measured using diametral compression tests (Berenbaum (1959); Fahad (1996)) and compressive strengths using uniaxial compression tests. The $Zn_{2.8}$ sponge is stronger than $Zn_{2.1}$, as predicted by Eq. 1, because $Zn_{2.8}$ is denser than $Zn_{2.1}$. The 34% increase in sponge density from $Zn_{2.1}$ to $Zn_{2.8}$ translates to a 293% increase in tensile strength.

Scaled-up practical electrode sizes are calculated to be 10×10×0.2 cm and 4.6×4.6×0.2 cm for $Zn_{2.8}$ and $Zn_{2.1}$ sponges, respectively (FIG. 5). The $Zn_{2.8}$ sponge supports larger geometric areas than $Zn_{2.1}$ because of $Zn_{2.8}$'s higher tensile strength (FIG. 4). Large $Zn_{2.8}$ electrodes enable the use of less packaging for battery systems where multiple battery cells must be connected in series and/or parallel. Assuming the electrode is a square sheet, practical electrode side length is calculated as a function of electrode thickness such that a cantilevered sponge plate, clamped on one of its edges, experiences half the allowable tensile strength induced by bending (Beer (2009)). Tensile rather than compressive strength is used as the limiting parameter because the Zn sponges are more prone to failure under tension than compression (FIG. 3). Practical electrode side length (L) is a function of tensile strength ($\sigma_T$), electrode thickness (h), factor of safety (f), which for this purpose is equal to 2, sponge density ($\rho$), and the acceleration of gravity (g) as shown in Eq. 2.

Rechargeable Capacity and Cycle Life of $Zn_{2.8}$ Sponge in a Ni—Zn Cell

Figure 19:
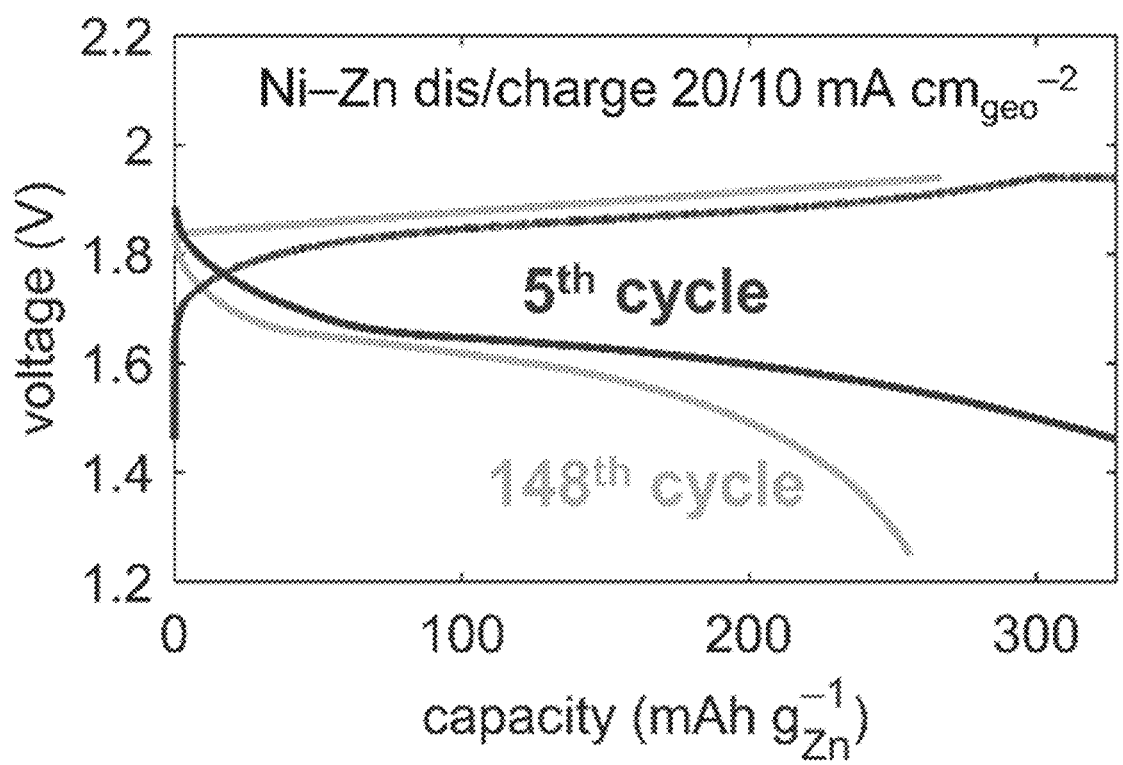
FIG. 19 shows voltage versus gravimetric capacity of the $5^{th}$ and $148^{th}$ charge and discharge cycle from a nickel-zinc cell using $Zn_{2.8}$ discharged at 20 $mA\, cm_{geo}^{-2}$ and charged at 10 $mA\, cm_{geo}^{-2}$.
Figure 20:
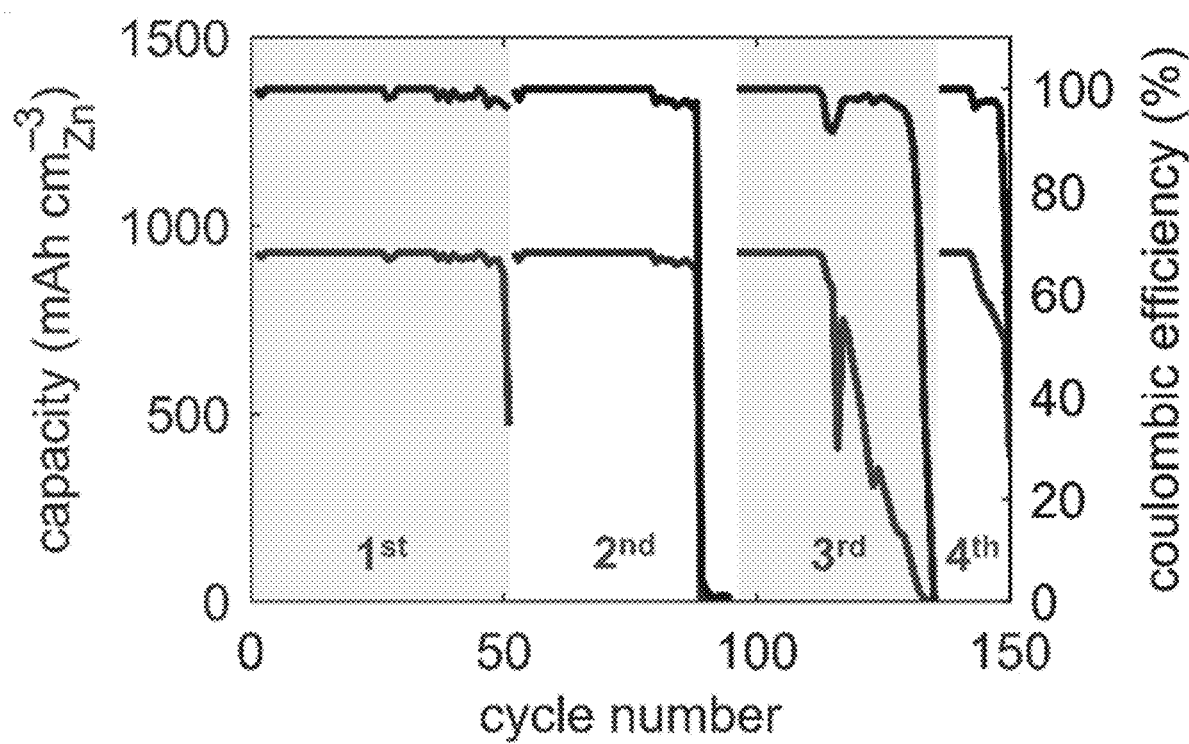
FIG. 20 shows volumetric discharge capacity and coulombic efficiency versus cycle number.

The $Zn_{2.8}$ sponge attains 102% more rechargeable volumetric capacity in a nickel-zinc (Ni—Zn) cell than the highest reported corresponding value in the literature (Parker (2017)), yielding 928 mAh $cm_{Zn}^{-3}$ for 150 cycles with a coulombic efficiency near 100% (FIGS. 19 and 20) and gravimetric capacity of 328 mAh $g_{Zn}^{-1}$. The cell was discharged at 20 mA $cm_{geo}^{-2}$ and charged at 10 mA $cm_{geo}^{-2}$. The capacity fade is primarily attributed to the harvested Ni-electrodes. After 51 cycles, the volumetric discharge capacity dropped sharply during cycling (FIG. 20). At this point, the cell was opened, revealing that the separator assembly was stained black, but the Ni-electrode appeared to be well-hydrated with electrolyte. The Ni-electrodes were harvested from commercial (Panasonic) nickel metal hydride (Ni—MH) AA batteries that were likely not designed for the high cycling rates and depths of discharge used to test the Zn-sponge electrodes.

Figure 21:
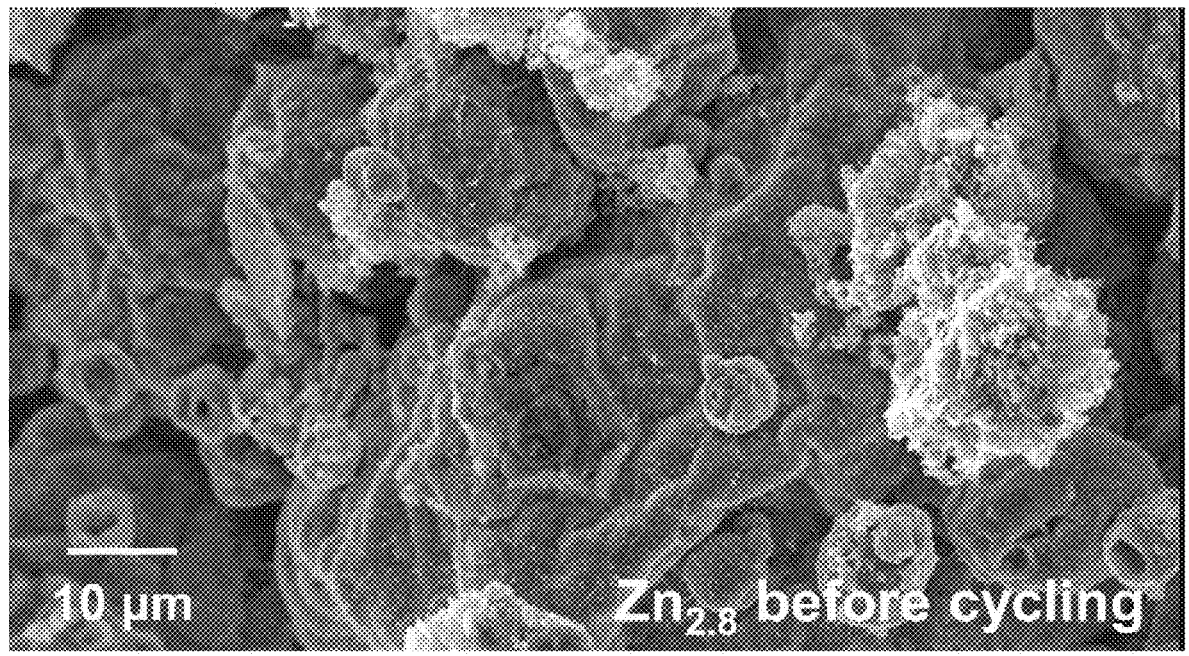
FIG. 21 shows higher resolution micrographs of a cross-sectioned $Zn_{2.8}$ sponge before electrochemical cycling.
Figure 22:
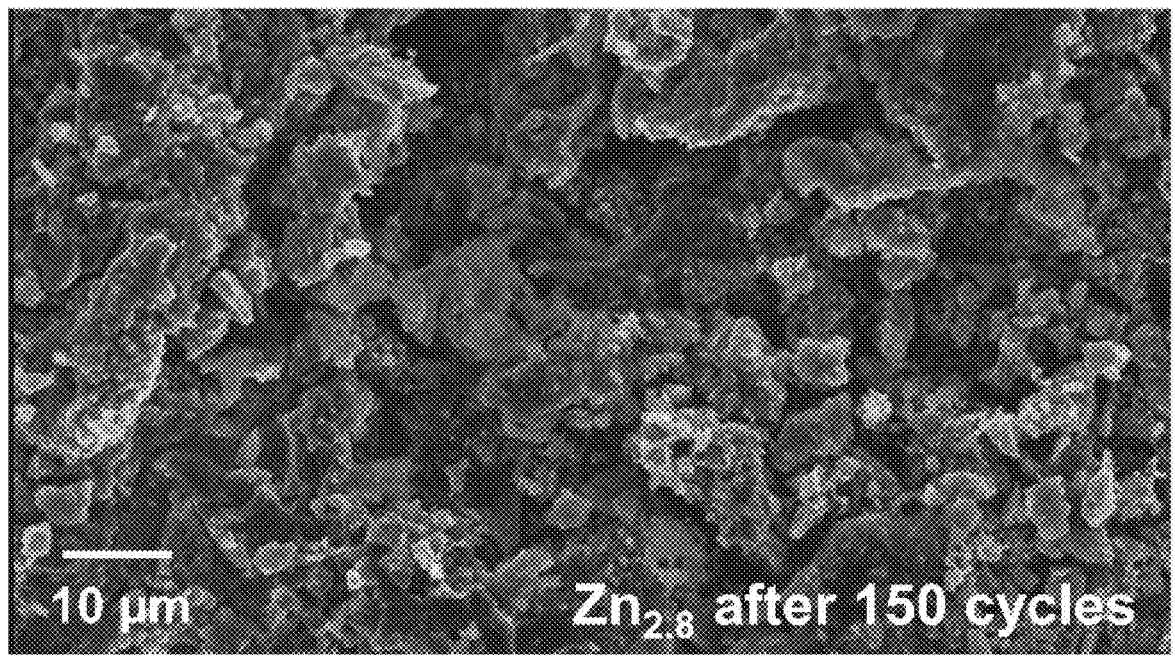
FIG. 22 shows higher resolution micrographs of a cross-sectioned $Zn_{2.8}$ sponge after electrochemical cycling.

The Ni-electrodes may exfoliate materials during cycling that leads to cell failure. To test this hypothesis, the Ni electrode and dirty separator assemblies were replaced with fresh versions once capacity fade starts (FIG. 20). With every replacement, capacity and coulombic efficiency were restored, indicating a well-functioning Zn electrode but a failing Ni electrode and/or separator assembly. The poorly charging Ni electrodes force the Zn sponge to discharge beyond its intended state-of-charge. This increasing mismatch in the amount of active material available to cycle ultimately curtails cycle life because of continuing to demand 328 mAh $g_{Zn}^{-1}$. This growing imbalance explains the diminishing returns on cycle life observed after each Ni electrode and separator replacement. No dendrites were observed on the Zn-sponge electrode after the 150 cycles (FIGS. 20 and 21).

Calculation of Practical Square-Electrode Side Length

The maximum moment ($M_{max}$) experienced by a cantilevered prismatic beam of length (L) with a distributed load (w) is $wL^2/2$ (Stock et al. (2019). Benchmarking anode concepts: The future of electrically rechargeable zinc-air batteries. *ACS Energy Lett.* 4, 1287-1300). If the distributed load is caused by the weight of the beam itself with a width (b), thickness (h), density ($\rho$), and acceleration of gravity (g), the maximum moment is expressed in Eq. 3.

$$M_{max} = \rho g h b L^2 / 2 \qquad \text{Eq. 3}$$

The maximum stress ($\sigma_{max}$) of a prismatic beam experiencing a maximum moment ($M_{max}$) is expressed in Eq. 4.

$$\sigma_{max} = 6 M_{max} / b h^2 \qquad \text{Eq. 4}$$

Substituting Eq. 3 into Eq. 4 yields Eq. 5.

$$\sigma_{max} = 3 \rho g L^2 / h \qquad \text{Eq. 5}$$

For this study, the Zn sponges are more prone to fail in tension than in compression for a cantilever loading scenario, so tensile strength ($\sigma_T$) can be substituted for maximum stress. Also, a factor of safety (f) is desired, which converts Eq. 5 to Eq. 2 when length is solved for.

$Zinc_{3.3}$-Sponge Synthesis

Zn sponges made using a green protocol yielded similar or superior performance to previously reported $Zn_{2.8}$ sponges (Hopkins et al. (2020) *Energy Storage Mater.* 27, 370-376), which are synthesized using conventional, cost-prohibitive CMC. The 2.8 sponge has a density of 2.83±0.09 g $cm^{-3}$. The Zn sponge created using the green synthesis has a higher density of 3.26±0.10 g $cm^{-3}$ and is referred to as "$Zn_{3.3}$". Zn-sponge density and consequently performance can be tuned by adding more or less porogen to the Zn-paste mixture.

A mass of 0.120±0.001 g of high viscosity (1500-3000 cP, 1 wt % in $H_2O$ at 25° C.) cellulose gum also known as carboxymethylcellulose (CMC) sodium salt (MilliporeSigma, CAS#9004-32-4) was added to 10.5 mL of deionized water. This mixture was vortexed and stirred by hand for 5 min. A mass of 2.400±0.001 g of corn starch (Argo 100% pure corn starch) was added to the mixture and vortexed while stirring by hand for 2 min. A mass of 120.00±0.01 g of Zn powder (EverZinc) was added to the mixture and stirred and vortexed for 2 min. Zinc powder was used that consisted of mostly solid, globular particles with an average diameter of 50 μm (89.2% of particles <75 μm and 0% of particles >250 μm, containing 307 ppm of bismuth and 307 ppm of indium). This mixture was pressed into mold cavities. The Zn paste was left in the cavities to dry out at 60° C. overnight. The mold was machined from DELRIN® acetal (polyoxymethylene also known as POM). The dried Zn paste preform was easiest to demold when the mold was warm. In addition, unsalted butter can act as a mold release that can be applied before the Zn paste is pressed into the mold. The preform was then transferred to the baking mesh shown in FIG. 2 and heated in a tube furnace as previously reported (Hopkins (2020). *Energy Storage Mater.*). The first portion of the baking occurred under $N_2$. After 367 min, the temperature was ramped up (FIG. 23) and air was piped into the tube furnace. To create a more sustainable sponge, bismuth and indium could be eliminated and a gel or polymer electrolyte could aid in corrosion suppression when alkaline electrolytes are desired. Doped Zn particles were used out of laboratory convenience.

Diametral and Uniaxial Compression Tests

Diametral and uniaxial compression tests were performed using a constant displacement of 1 mm $min^{-1}$. The surfaces of the crushing plates were not lubricated. The diameter of cylindrical samples used in both tests was 11.5 mm with a thickness of 4 mm for uniaxial and diametral compression.

Battery-Cell Fabrication

Silver-Zn and Ni—Zn cells were assembled as previously reported (Hopkins (2020)). Zinc-air cells used tin-foil current collectors on the Zn-electrode side and a platinum or nickel wire current collector on the air-breathing electrode side. The electrolyte was 9 M KOH. One layer of CELGARD® 3501 was placed on the Zn-electrode side with one layer of 700/28 Freudenberg separator on the air-breathing electrode side. Tin and platinum were used as current collectors for laboratory convenience, but more sustainable options are available. For example, a Zn or carbon-based current collector could be used for the Zn electrode and a Ni current collector could be used for the air-breathing electrode. All battery cells reported in this work used 0.3 to 0.4 mL of electrolyte.

Air-Breathing Electrode Fabrication

Air-breathing electrodes were fabricated as a layered, pressed pellet comprising a catalyst layer, a nickel-foam current collector, and a gas-diffusion layer (GDL). The catalyst layer was made from a 50/50 wt % catalyst mixture of $Ni_2FeO_x$ aerogel and $MnO_x$ aerogel, acetylene black carbon (Cabot) as a conductive component, and PTFE binder (60 wt % dispersion in $H_2O$) using a 20/65/15 weight ratio of catalyst/conductive carbon/PTFE. The methods used to fabricate $Ni_2FeO_x$ and $MnO_x$ aerogels are reported in the literature (Ko et al. (2017) Langmuir, 33, 9390-9397; Ko et al. (2018). *J. Electrochem. Soc.* 165, H777-H783). The $Ni_2FeO_x$ aerogel was heated at 275° C. in flowing Ar for 4 h under a 2° C. $min^{-1}$ ramp before incorporation into the catalyst layer. The cryptomelane-type $MnO_x$ was calcined at 300° C. in air for 4 h under a 2° C. $min^{-1}$ ramp (Yang et al. (2016) *Sci. Adv.* 2, e1501122).

To prepare the air-breathing electrode catalyst layer, 0.05 g of $Ni_2FeO_x$ and 0.05 g of $MnO_x$ were combined with 0.33 g of carbon, 0.127 g of 60 wt % PTFE aqueous dispersion, and 5 mL of water in an agate ball mill along with 13.5 g of agate mill media. The mixture was milled in a Fritsch Pulverisette 7 mill at 300 rpm in three 15 min intervals with a 5 min rest between each interval. The resulting mixture was collected in a beaker using ethanol to rinse the media and mill and then dried at 70° C. overnight in static air to produce a composite powder. The GDL was prepared in a similar fashion using a 70/30 weight ratio of acetylene black to PTFE. The dried composite catalyst layer and GDL were weighed into 0.050 g portions and a nickel mesh was sandwiched between the two portions in a 1 $cm^2$ die. The composites were pressed at 20.7 MPa for 1 min to form a 0.8 mm-thick, circular gas-diffusion electrode.

Figure 23:
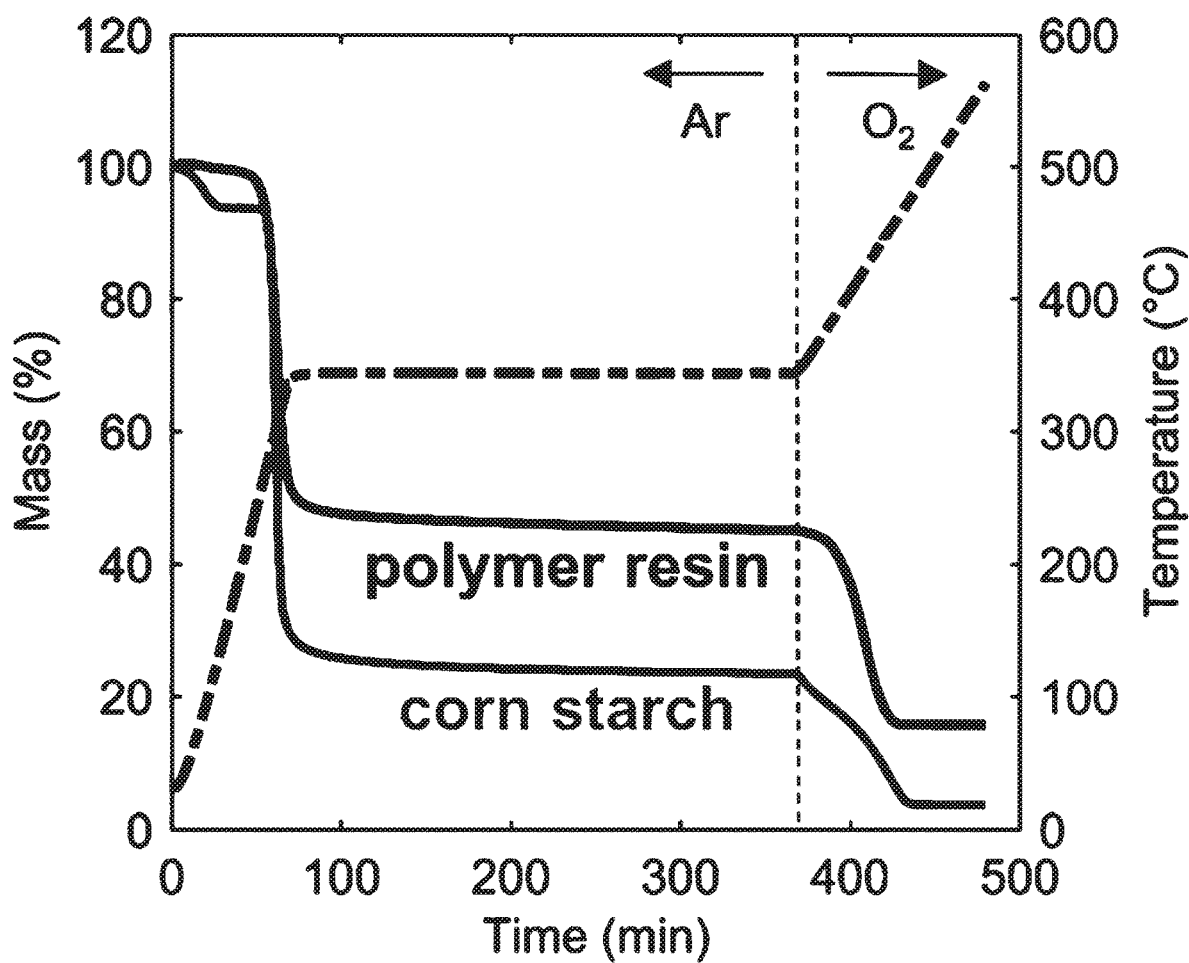
FIG. 23 shows percentage mass and temperature versus time measured by thermogravimetric analysis of the porogens, CMC resin and corn starch, used to create $Zn_{2.8}$ and $Zn_{3.3}$ sponges, respectively. The thermogravimetric analysis, patterned after the Zn-sponge baking protocol, starts under argon (Ar) and then switches to a mixture of Ar and oxygen ($O_2$) to mimic air.
Figure 24:
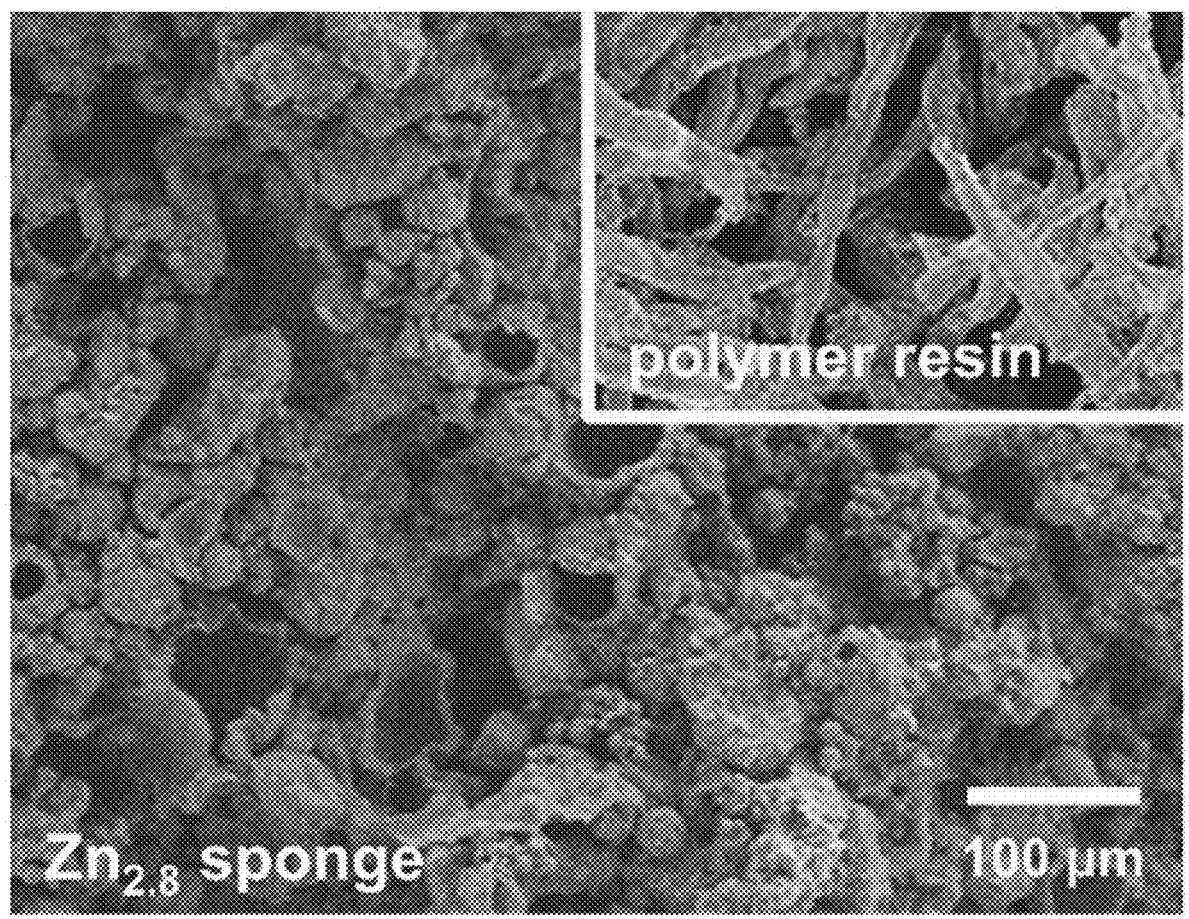
FIG. 24 shows a scanning electron micrograph (SEM) of a cross-sectioned $Zn_{2.8}$ sponge and CMC polymer resin (top right). The scale bars refer to both sponge and porogen images.
Figure 25:
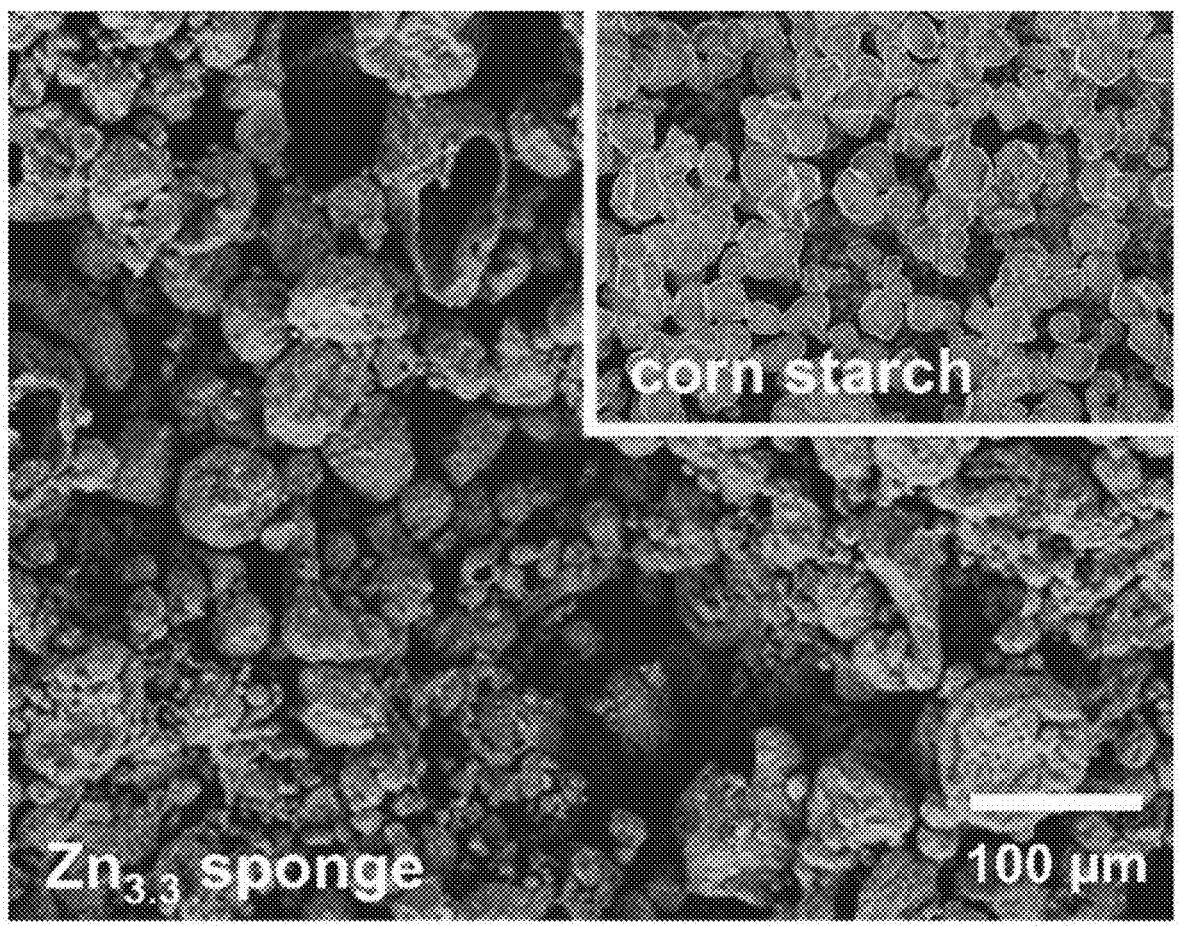
FIG. 25 shows an SEM of a cross-sectioned $Zn_{3.3}$ sponge and corn starch (top right). The scale bars refer to both sponge and porogen images.

Off-the-shelf corn starch was selected as a porogen substitute for polymer resin because of its particle size and burnout profile. The corn starch particles are 10 μm in diameter and approximately the same size as the thickness of the CMC polymer-resin branches (FIGS. 24 and 25). In contrast, the average size of the Zn particles is 50 μm in diameter. The corn starch burns out under the baking protocol used for Zn-sponge synthesis as verified by thermogravimetric analysis (FIG. 23). After baking, 16% of a CMC residue remains while only 4% of corn starch char remains (FIG. 23). A higher percentage of porogen char in the Zn sponge is undesirable because the carbonaceous residue can clog the pores of the sponge and reduce useable capacity and power. Other food-based or food-waste porogens may be suitable. For example, in early prototypes of the $Zn_{3.3}$ sponge, it was found that ball-milled spent coffee grounds act as a suitable porogen, but off-the-shelf corn starch was used to avoid preprocessing.

Figure 26:
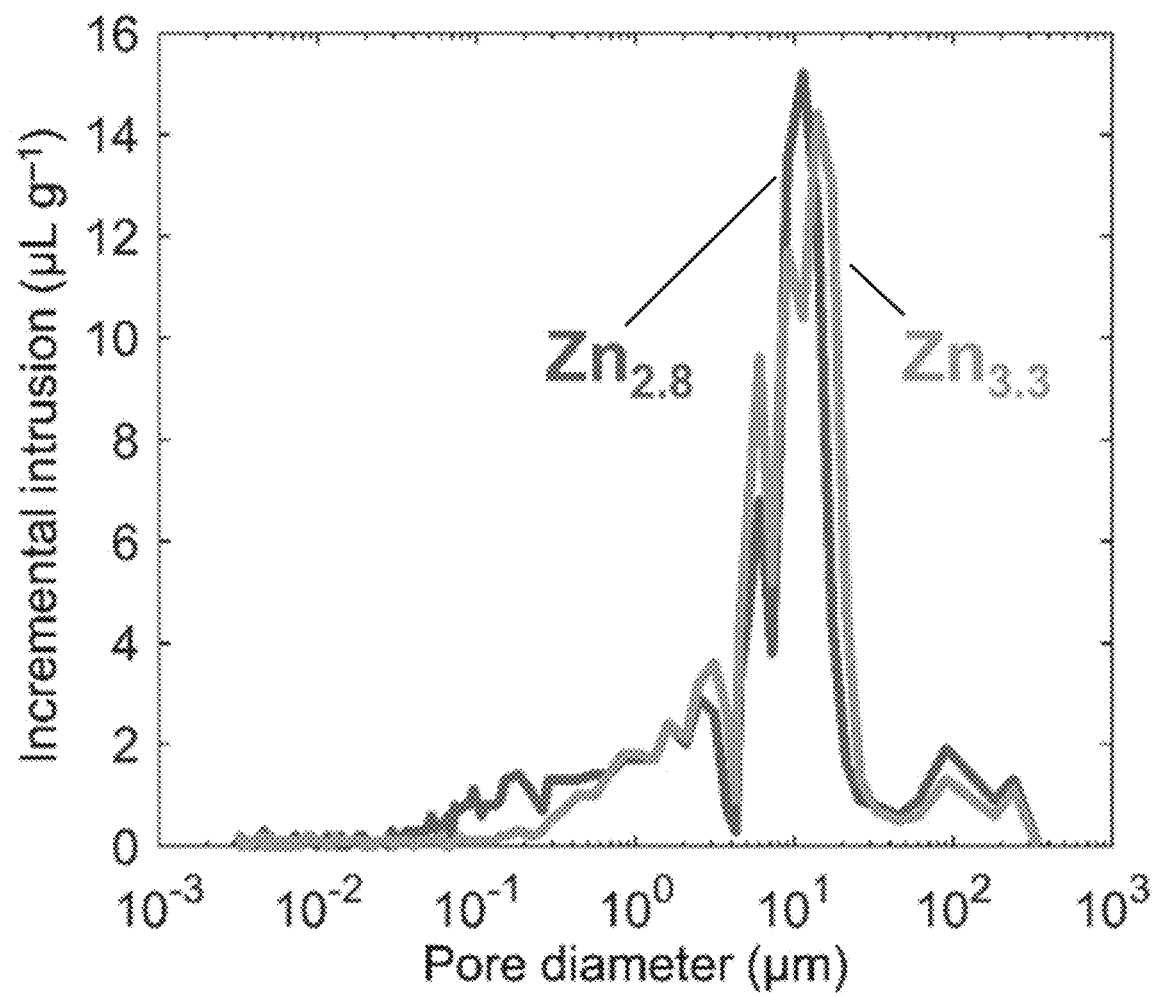
FIG. 26 shows incremental intrusion versus pore-size diameter measured via mercury intrusion for representative $Zn_{2.8}$ and $Zn_{3.3}$ sponges.

After verifying that corn starch meets the desired sizing and burnout properties, it was found that the $Zn_{2.8}$ and $Zn_{3.3}$ sponges have comparable total pore volumes of 0.13 mL $g^{-1}$ and pore diameter distributions centered on 10 μm (FIG. 26) as determined using mercury-intrusion porosimetry. The fact that both pore-diameter distributions peak at 10 μm suggests that the characteristic dimension of the porogen governs pore size in the sponge. The $Zn_{2.8}$ and $Zn_{3.3}$ sponges also have comparable porosity of ~50%. If no porogen is added, the Zn particles fuse to form a minimally porous Zn cylinder.

Mechanical and Electrochemical Performance of $Zn_{3.3}$ Sponge

Figure 27:
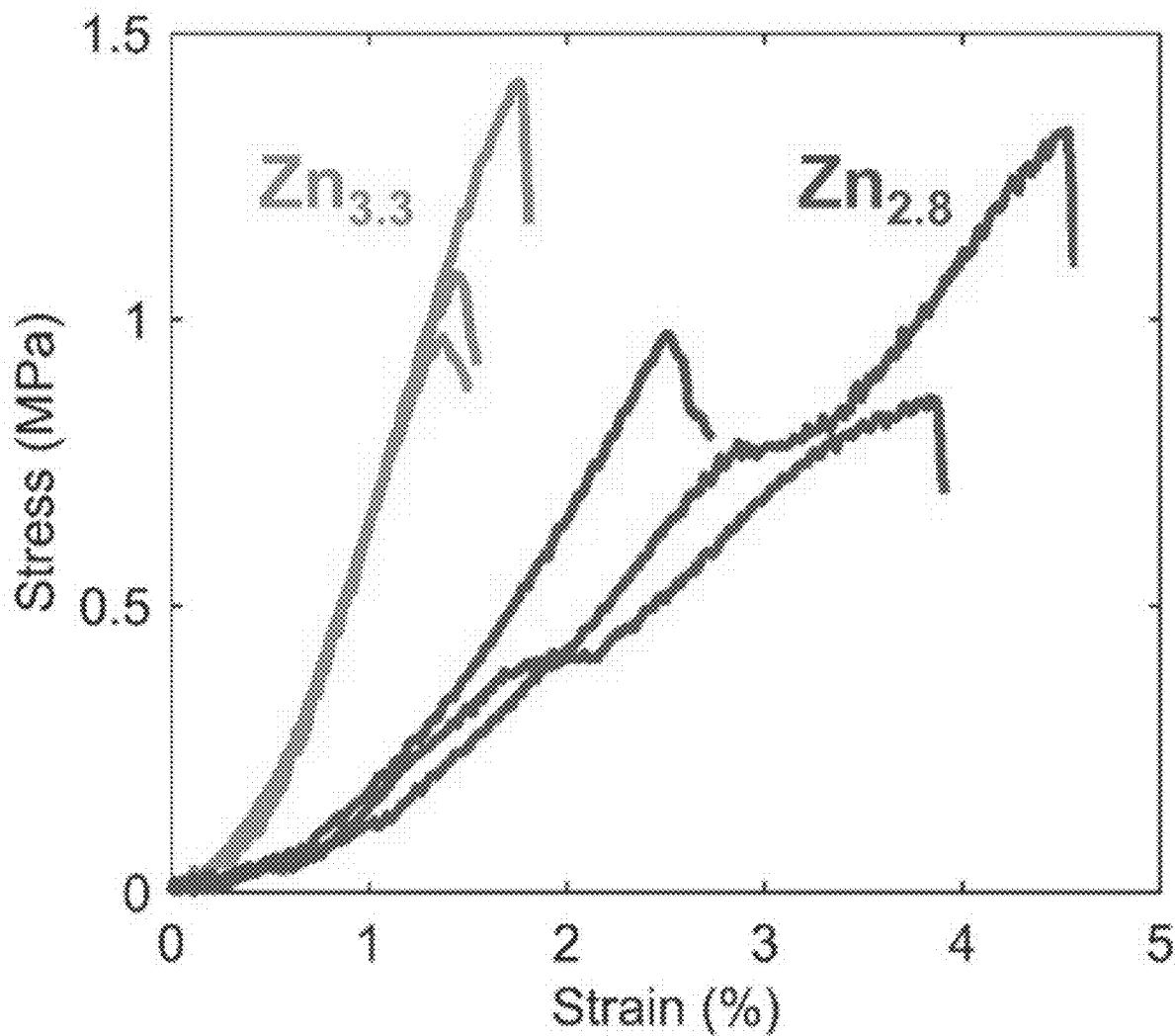
FIG. 27 shows tensile stress versus strain of $Zn_{2.8}$ and $Zn_{3.3}$ sponges.
Figure 28:
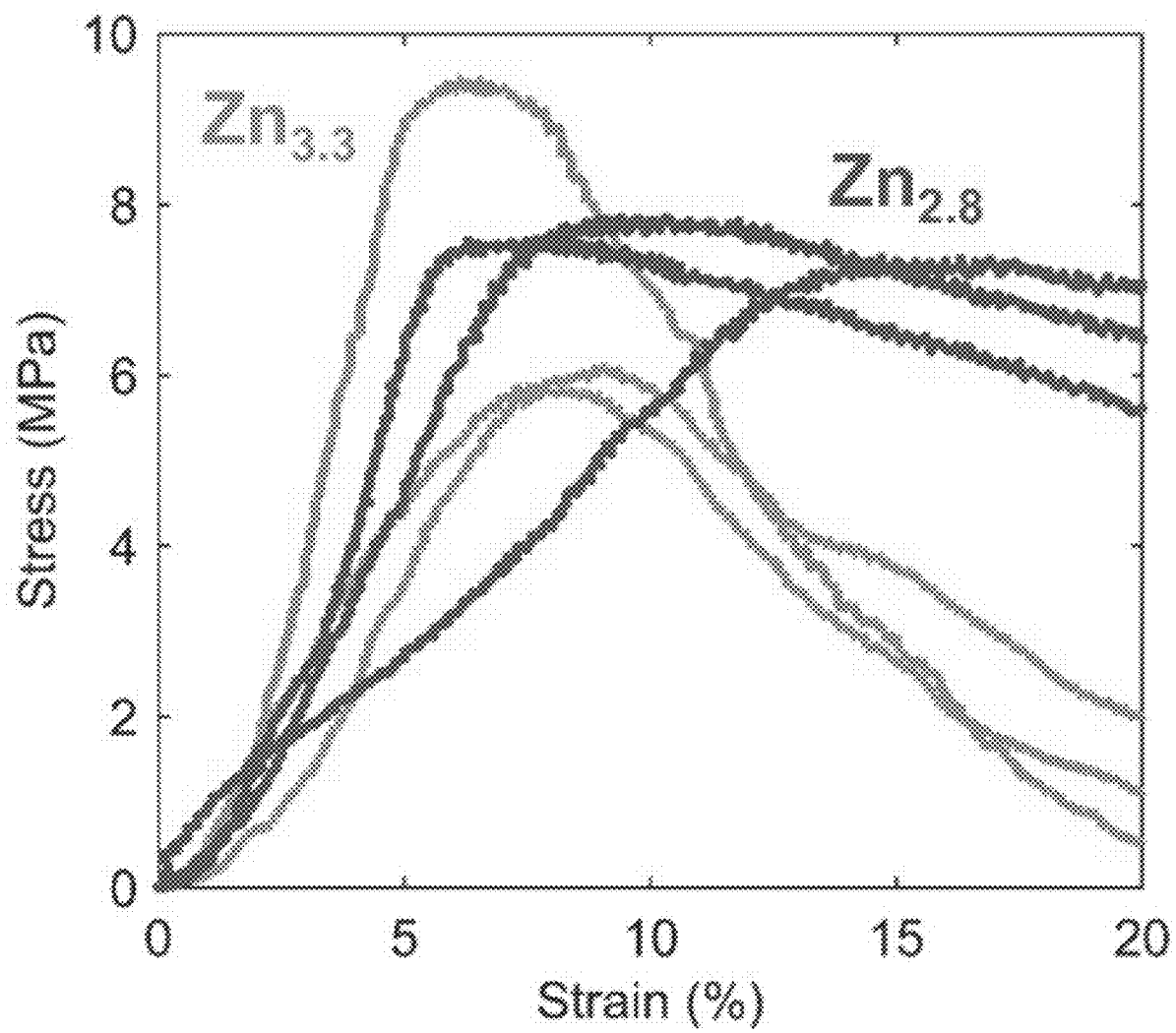
FIG. 28 shows compressive stress versus strain of $Zn_{2.8}$ and $Zn_{3.3}$ sponges.

To ensure that the performance of the $Zn_{3.3}$ sponge is similar or superior to the previously tested $Zn_{2.8}$ sponge, the mechanical properties were measured and it was found that the $Zn_{2.8}$ and $Zn_{3.3}$ sponges have comparable tensile strengths of 1.1±0.2 MPa and 1.2±0.2 MPa (FIG. 27) and compressive strengths of MPa 7.6±0.2 MPa and 7.1±2.0 MPa (FIG. 28), respectively (Ashby et al. (2000). Metal Foams: A Design Guide, Elsevier).

Figure 29:
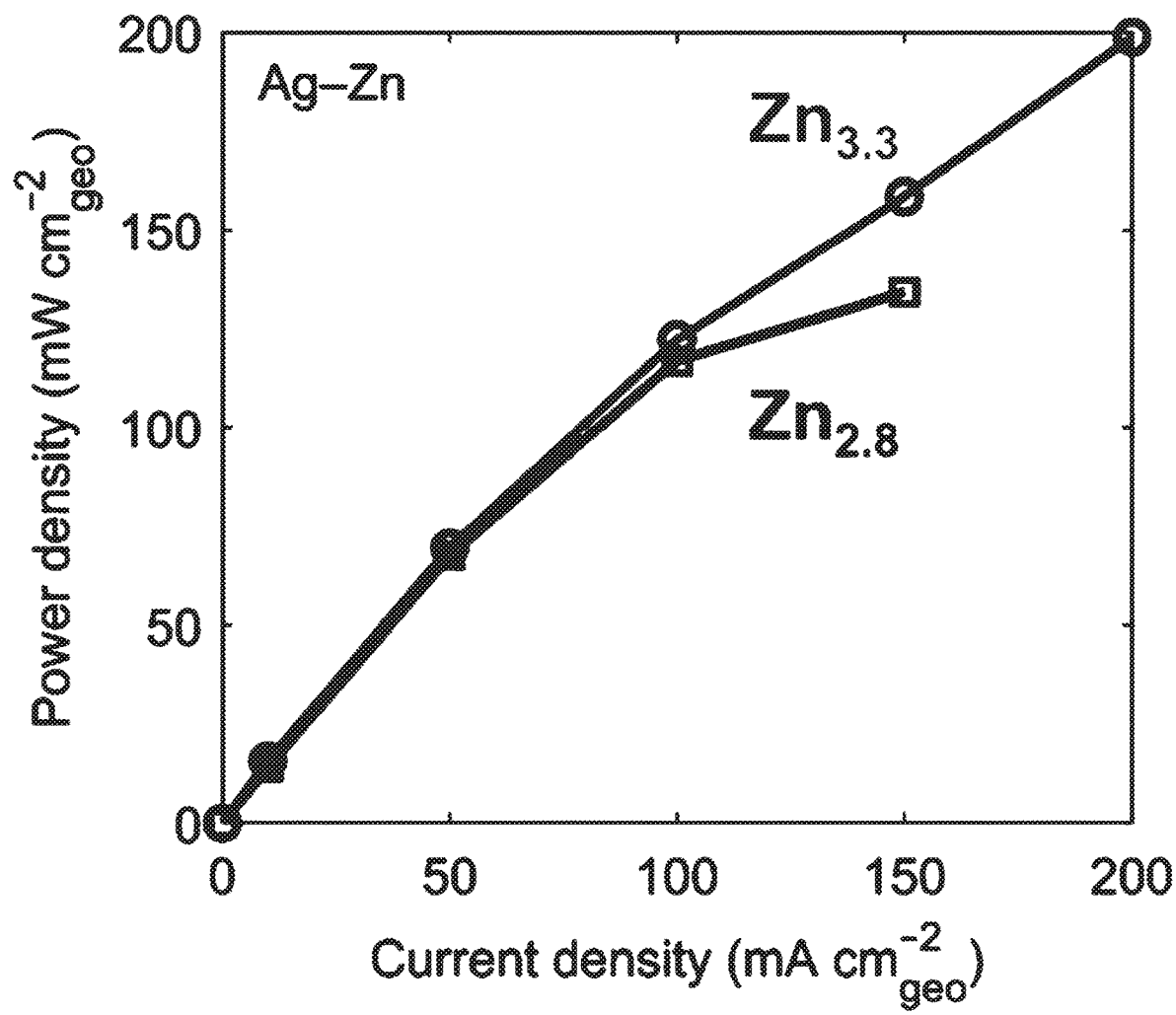
FIG. 29 shows power versus current density of silver-zinc (Ag—Zn) cells using $Zn_{2.8}$ and $Zn_{3.3}$ electrodes.
Figure 30:
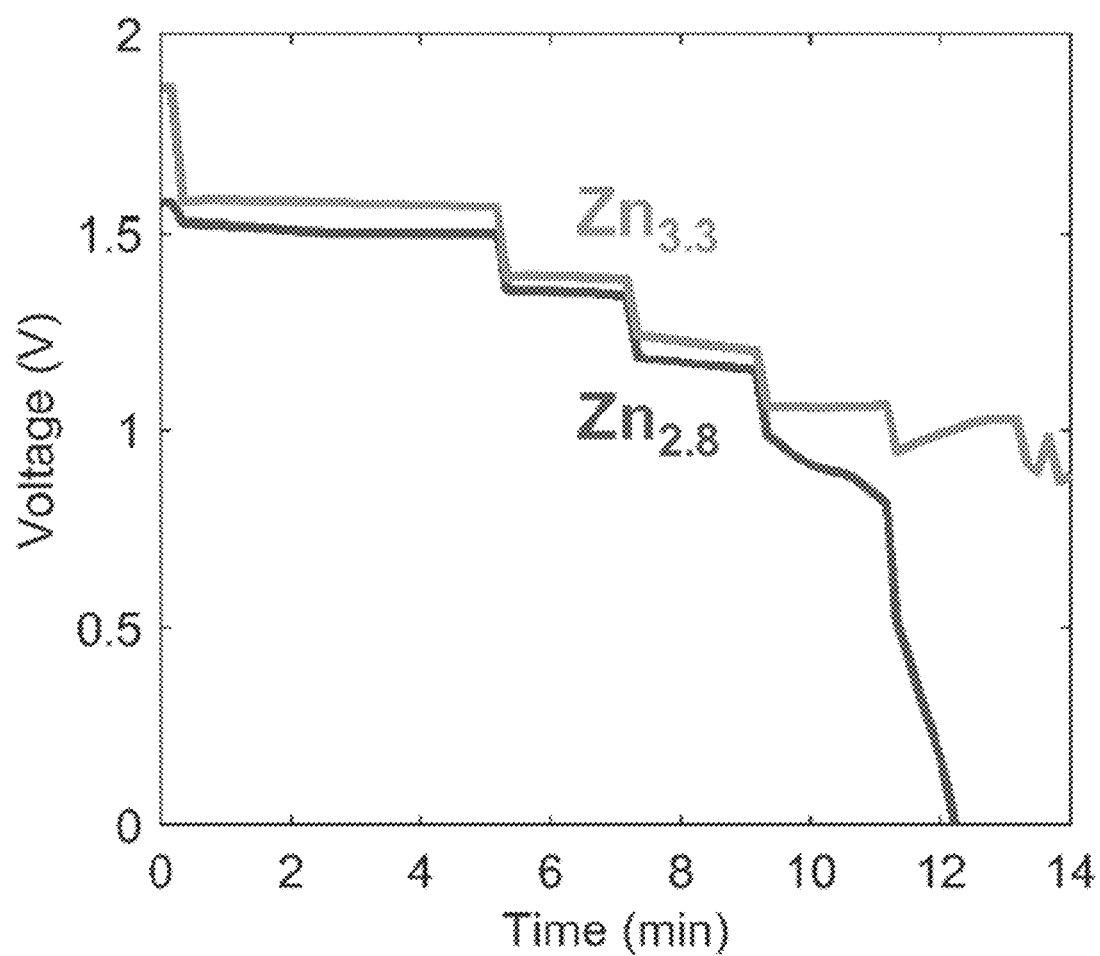
FIG. 30 shows voltage versus time of $Zn_{3.3}$ and $Zn_{2.8}$ electrodes in Ag—Zn cells.
Figure 31:
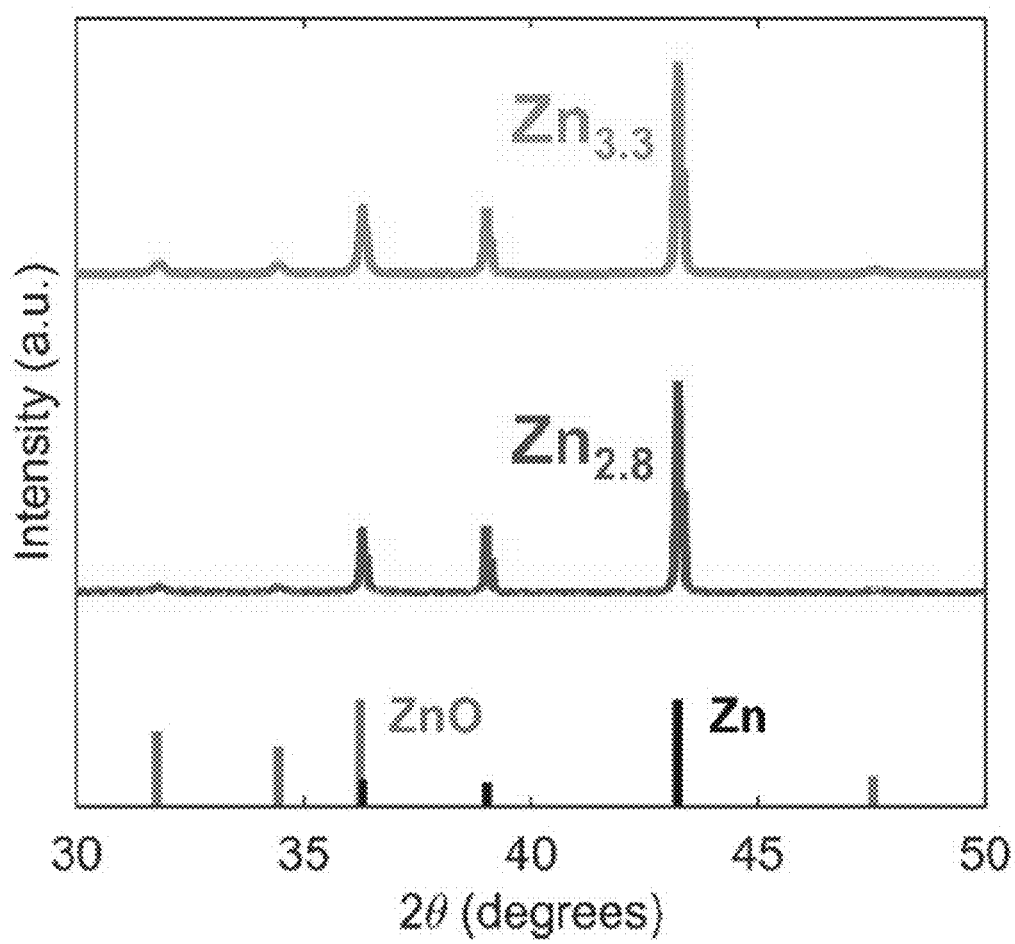
FIG. 31 shows X-ray powder diffraction of $Zn_{2.8}$ and $Zn_{3.3}$.

Power performance in silver-zinc (Ag—Zn) cells was compared and it was found that 1 mm-thick $Zn_{2.8}$ and $Zn_{3.3}$ sponges achieve peak powers of 134±8 mW $cm_{geo}^{-2}$ and 199±6 mW $cm_{geo}^{-2}$ (per geometric surface area), respectively (FIGS. 29 and 30). Ag—Zn cells were used because the silver electrode can match the high-rate capability of the Zn sponge. The higher power of $Zn_{3.3}$ is primarily attributed to its thinner ZnO shell. Using mercury-intrusion porosimetry, it was found that the $Zn_{2.8}$ and $Zn_{3.3}$ sponges have respective specific surface areas of 3.9 and 4.0 $m^2$ $g^{-1}$ at an absolute pressure of 412 MPa. The $Zn_{3.3}$ sponge has a higher ratio of Zn to zinc oxide (Zn:ZnO) than $Zn_{2.8}$ (as determined using X-ray diffraction, FIG. 31). The Zn content is 72 and 78% for $Zn_{2.8}$ and $Zn_{3.3}$, respectively, with ZnO as the remaining percentage. These data suggest that $Zn_{3.3}$ has a thinner ZnO shell and a larger cross-sectional area of metallic Zn throughout the volume of the sponge, which enables higher electronic conductivity. The corn starch-derived $Zn_{3.3}$ sponge also has less passivating porogenic residue at its surface (FIG. 23). A specific surface area of 4.0 $m^2$ $g^{-1}$ limits corrosion reactions at the sponge and yields a minimal self-discharge rate of 1% per year (Hopkins (2020). *Energy Storage Mater.*). The measured corrosion rate is low in part because the majority of the electrolyte is stored in the pores of the Zn sponge and quickly becomes saturated with zincate, which slows corrosion.

Figure 32:
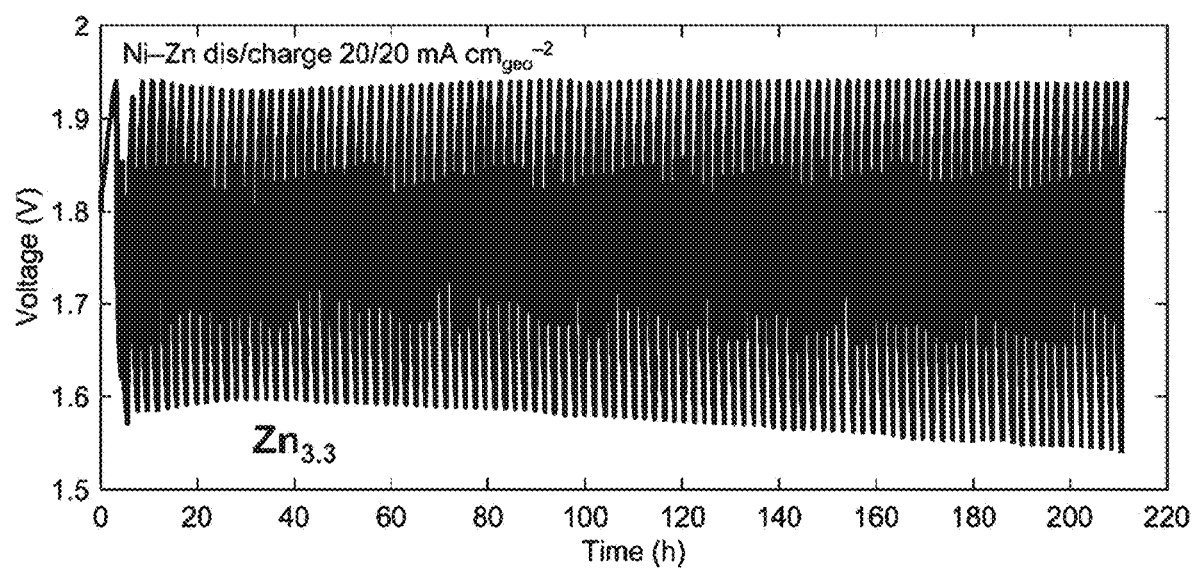
FIG. 32 shows voltage versus time of $Zn_{3.3}$ electrode cycled at 20 $mA\, cm_{geo}^{-2}$ over 100 times in a Ni—Zn cell. The initial, irregular voltage profiles were due to a potentiostat programming error that was corrected for the remaining cycles.
Figure 33:
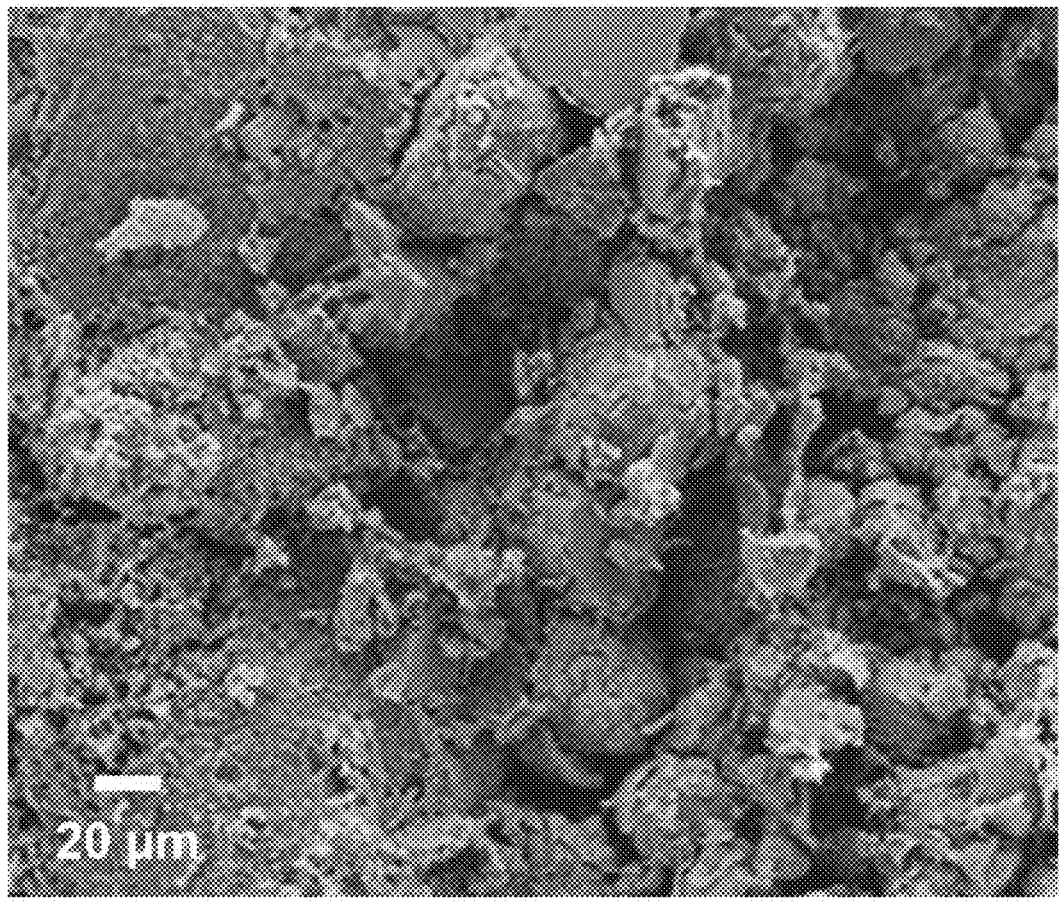
FIG. 33 shows microscopic analysis of post-cycled cross-sectioned $Zn_{3.3}$ from a Ni—Zn cell cycled at 20 $mA\, cm_{geo}^{-2}$ over 100 times.

To verify that the $Zn_{3.3}$ sponge retains dendrite-suppressing capabilities, the $Zn_{3.3}$ sponge was cycled in a Ni—Zn cell for 100 cycles at 20 mA $cm_{geo}^{-2}$ to 10% depth of discharge with respect to the total amount of elemental Zn in the cell ($DOD_{Zn}$) (FIG. 32). No dendrites were observed by SEM after this cycling protocol (FIG. 33). Even when charging the cell at global current densities above those shown to sprout dendrites (Ko (2018)), the low local current density of 0.002 mA $cm_{act}^{-2}$ (per actual surface area of sponge) suppresses dendrite formation.

Figure 34:
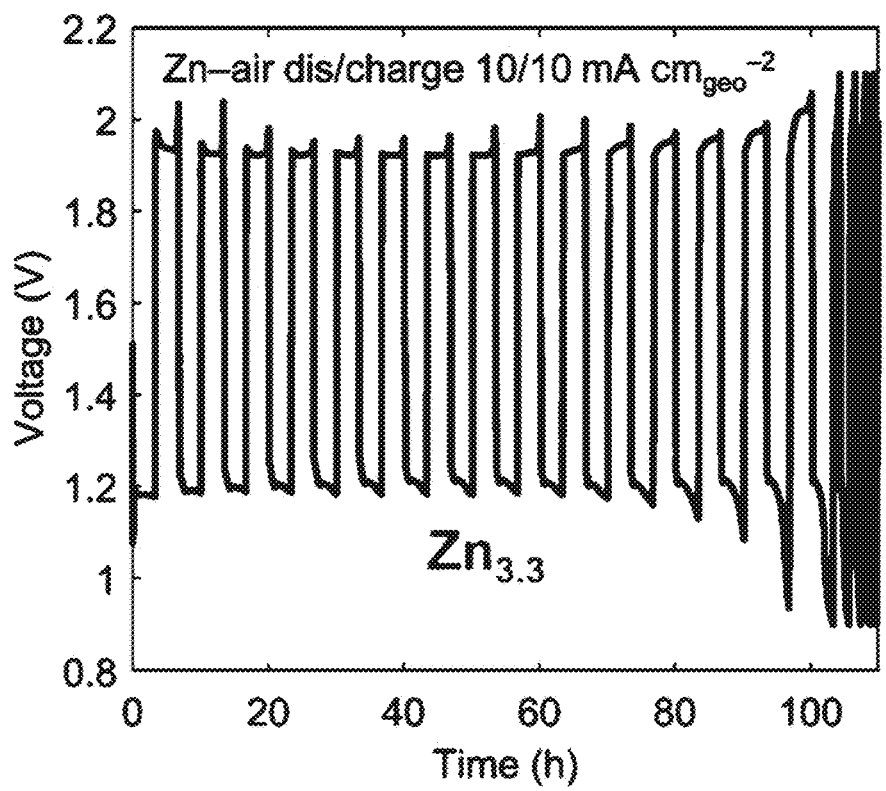
FIG. 34 shows voltage versus time of a Zn-air cell using a $Zn_{3.3}$ electrode cycled at 10 $mA\, cm_{geo}^{2}$.
Figure 35:
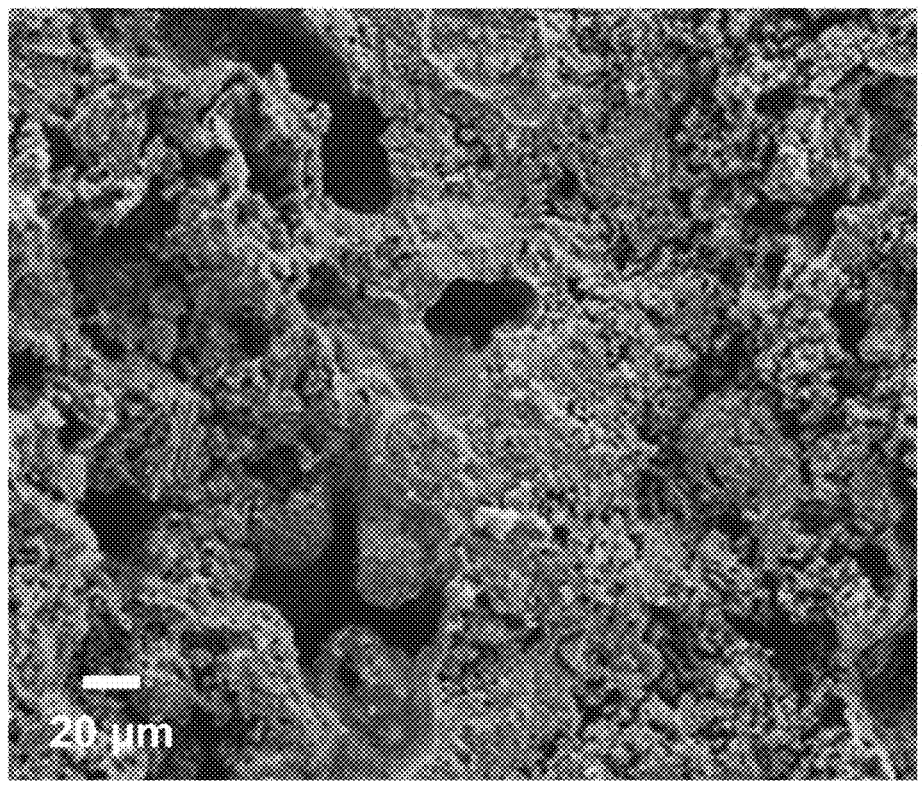
FIG. 35 shows microscopic analysis of post-cycled cross-sectioned $Zn_{3.3}$ from a Zn-air cell.

The $Zn_{3.3}$ sponge was then tested in a Zn-air cell, projected to be the lowest cost and most energy dense of the sustainable batteries. Cycling the sponge versus a bifunctional air-breathing cathode containing aerogel-based electrocatalysts ($Ni_2FeO_x$ and $MnO_2$) at 10 mA $cm_{geo}^{-2}$ for 16 cycles to 33.4 mA h $cm_{geo}^{-2}$ delivers a 3200% increase in rechargeable areal capacity over the majority of previously reported studies (FIG. 34 and Table 1). At this cycling capacity, which maps to 21% $DOD_{Zn}$, no dendrites were observed using an electrolyte volume of 0.3 to 0.4 mL in the cell (FIG. 35).

TABLE 1

Survey of rechargeable areal capacity versus cycle life of Zn-air cells

| Year | Cycle Life | Capacity mA h $cm_{geo}^{-2}$ | Source |
|---|---|---|---|
| 2016 | 15 | 20.0 | Yang et al., *Sci. Adv.*, 2016, 2, e1501122 |
| 2015 | 15 | 30.0 | Sumboja et al., *ChemPlusChem*, 2015, 80(8), 1341-1346 |
| 2020 | 16 | 33.4 | $Zn_{3.3}$ |
| 2018 | 24 | 2.08 | Marcus et al., *J. Phys. Chem. Lett.*, 2018, 9, 2746-2750 |
| 2015 | 25 | 0.83 | Chen et al., *Energy Storage Mater.*, 2015, 1, 17-24 |
| 2017 | 32 | 10.0 | Sumboja et al., *Nanoscale*, 2017, 9, 774-780 |
| 2016 | 36 | 0.17 | Liu et al., *Adv. Mater.*, 2016, 28, 3000-3006 |
| 2016 | 100 | 0.83 | Wu et al., *Nano Energy*, 2016, 30, 801-809 |
| 2017 | 102 | 1.67 | Meng et al., *Nano Res.*, 2017, 10, 4436-4447 |
| 2020 | 120 | 0.21 | Chen et al., *J. Power Sources*, 2020, 450, 227660 |
| 2018 | 150 | 1.25 | Li et al., *Chem. Commun.*, 2015, 51, 8841-8844 |
| 2015 | 160 | 1.00 | Sumboja et al., *Adv. Energy Mater.*, 2017, 7, 1700927 |
| 2017 | 175 | 0.12 | Fan et al., *Small*, 2017, 13, 1700099 |
| 2017 | 180 | 0.83 | Ma et al., *ACS Nano*, 2018, 12, 1949-1958 |
| 2018 | 220 | 0.45 | Sumboja et al., *J. Power Sources*, 2016, 332, 330-336 |
| 2016 | 270 | 4.00 | Pei et al., *Energy Environ. Sci.*, 2017, 10, 742-749 |
| 2017 | 300 | 0.92 | Ma et al., *Adv. Energy Mater.*, 2019, 9, 1803046 |
| 2019 | 600 | 0.46 | Lin et al., *ACS Appl. Energy Mater.*, 2019, 2, 1747-1755 |
| 2019 | 1000 | 0.84 | Chen et al., *Carbon*, 2019, 152, 325-334 |
| 2019 | 1000 | 1.67 | Xiao et al., *Appl. Catal. B*, 2020, 265, 118603 |
| 2020 | 1100 | 1.67 | Shinde et al., *Energy Environ. Sci.*, 2019, 12, 727-738 |

Excluded from these data are those literature values derived from reports that use air-breathing electrodes containing scarce, high-risk elements. Most reported Zn-air cells that demonstrate a high cycle count do so at areal capacities near 1 mA h $cm_{geo}^{-2}$, which is far below the technologically relevant value (Parker et al. (2018). *Joule.* 2, 2519-2527) of 11.7 mA h $cm_{geo}^{-2}$. These low capacities are partially attributable to the poor rechargeable areal capacity of the zinc foil or powder-composite electrode commonly used in such studies. The two reported Zn-air batteries that achieved technological relevance for areal capacity operated for 30 and 90 h, but because these reports focused on catalyst design, details associated with $DOD_{Zn}$ and electrolyte volume were not included (Table 1, top two rows). Both parameters are required to assess Zn-air-cell practicality. In contrast, the Zn-air cell reported here lasts for 107 h before capacity loss and uses practical quantities of Zn and electrolyte. As the performances of positive electrodes improve, $Zn_{3.3}$-sponge electrodes pave the way for sustainable, rechargeable, energy-dense batteries.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A method comprising:
   forming a mixture comprising:
     water;
     a water-soluble compound that increases the viscosity of the mixture;
     water-insoluble carboxymethyl cellulose resin porogen particles; and
     metallic zinc powder;
   placing the mixture in a mold to form a sponge;
   optionally drying the sponge;
   heating the sponge in an inert atmosphere at a temperature that fuses the zinc particles to each other to form a sintered sponge; and
   heating the sintered sponge in an oxygen-containing atmosphere at a temperature that forms ZnO on the surfaces of the sintered sponge;
   wherein the heating steps burn out the porogen.

2. The method of claim 1, wherein the mixture further comprises an organic liquid.

3. The method of claim 1, wherein the water-soluble compound is a water-soluble carboxymethyl cellulose resin.

4. The method of claim 1, wherein the heating steps are performed with the sponge in a metal mesh positioned to allow air flow through substantially all the openings in the mesh.

5. The method of claim 4;
   wherein the mesh is cylindrical in shape; and
   wherein the mesh is placed horizontally on a substrate that touches the mesh at most on two lines along the length of the mesh.

6. The method of claim 5, wherein heating the sponge in an inert atmosphere is performed at a peak temperature of 200 to 420° C.

7. The method of claim 5, wherein heating the sintered sponge in an oxygen-containing atmosphere is performed at a peak temperature of 420 to 700° C.

8. A zinc electrode made by the method of claim 5.

9. The zinc electrode of claim 8, wherein the zinc electrode has a density of at least 1.0 g $cm^{-3}$.

10. The zinc electrode of claim 8, wherein the zinc electrode comprises no more than 99 wt. % ZnO.

11. An electrochemical cell comprising:
an anode current collector;
the zinc electrode of claim 8 in electrical contact with the anode current collector;
an electrolyte;
a cathode current collector;
a cathode in electrical contact with the anode current collector; and
a separator between the zinc electrode and the cathode.

12. A method comprising:
providing a sponge comprising zinc particles and porogen particles;
placing the sponge in a cylindrical metal mesh positioned to allow air flow through substantially all the openings in the mesh;
wherein the mesh is placed horizontally on a substrate that touches the mesh at most on two lines along the length of the mesh;
heating the sponge in an inert atmosphere at a temperature that fuses the zinc particles to each other to form a sintered sponge; and
heating the sintered sponge in an oxygen-containing atmosphere at a temperature that forms ZnO on the surfaces of the sintered sponge;
wherein the heating steps burn out the porogen.

13. The method of claim 12, wherein heating the sponge in an inert atmosphere is performed at a peak temperature of 200 to 420° C.

14. The method of claim 12, wherein heating the sintered sponge in an oxygen-containing atmosphere is performed at a peak temperature of 420 to 700° C.

15. The method of claim 14, wherein heating the sintered sponge produces a zinc electrode comprising no more than 99 wt. % ZnO.

16. A method comprising:
forming a mixture comprising:
water;
a water-soluble compound that increases the viscosity of the mixture;
water-insoluble porogen particles; and
metallic zinc powder;
placing the mixture in a mold to form a sponge;
optionally drying the sponge;
heating the sponge in an inert atmosphere at a temperature that fuses the zinc particles to each other to form a sintered sponge; and
heating the sintered sponge in an oxygen-containing atmosphere at a temperature that forms ZnO on the surfaces of the sintered sponge;
wherein the heating steps are performed with the sponge in a cylindrical metal mesh positioned to allow air flow through substantially all the openings in the mesh;
wherein the mesh is placed horizontally on a substrate that touches the mesh at most on two lines along the length of the mesh; and
wherein the heating steps burn out the porogen.

17. The method of claim 16, wherein the mixture further comprises an organic liquid.

18. The method of claim 16, wherein the water-soluble compound is a water-soluble carboxymethyl cellulose resin.

19. The method of claim 16, wherein the porogen is corn starch.

20. The method of claim 16, wherein heating the sponge in an inert atmosphere is performed at a peak temperature of 200 to 420° C.

21. The method of claim 16, wherein heating the sintered sponge in an oxygen-containing atmosphere is performed at a peak temperature of 420 to 700° C.

22. A zinc electrode made by the method of claim 16.

23. The zinc electrode of claim 22, wherein the zinc electrode has a density of at least 1.0 g cm$^{-3}$.

24. The zinc electrode of claim 22, wherein the zinc electrode comprises no more than 99 wt. % ZnO.

25. An electrochemical cell comprising:
an anode current collector;
the zinc electrode of claim 22 in electrical contact with the anode current collector;
an electrolyte;
a cathode current collector;
a cathode in electrical contact with the anode current collector; and
a separator between the zinc electrode and the cathode.

* * * * *

UNITED STATES PATENT AND TRADEMARK OFFICE
CERTIFICATE OF CORRECTION

PATENT NO. : 11,069,889 B2  
APPLICATION NO. : 16/932695  
DATED : July 20, 2021  
INVENTOR(S) : Brandon J. Hopkins et al.

Page 1 of 1

It is certified that error appears in the above-identified patent and that said Letters Patent is hereby corrected as shown below:

On the Title Page

Item [73]:  
The Government of the United Stales of America, as represented by the Secretare of the Navy  
Should read:  
The Government of the United States of America, as represented by the Secretary of the Navy In the Claims In Claim 11, Column 19, Lines 7-8:  
a cathode in electrical contact with the anode current collector  
Should read:  
a cathode in electrical contact with the cathode current collector In Claim 25, Column 20, Lines 39-40:  
a cathode in electrical contact with the anode current collector  
Should read:  
a cathode in electrical contact with the cathode current collector Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*